United States Patent
Kravitz et al.

(10) Patent No.: US 10,700,853 B2
(45) Date of Patent: Jun. 30, 2020

(54) TOKEN IDENTITY AND ATTRIBUTE MANAGEMENT

(71) Applicant: International Business Machines Corporation, Armonk, NY (US)

(72) Inventors: David W. Kravitz, San Jose, CA (US); Dulce B. Ponceleon, Palo Alto, CA (US); Diego A. Masini, San Jose, CA (US); Raul O. Laprida, Capital Federal (AR); Andres Garagiola, Buenos Aires (AR); John B. Geagan, III, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 15/590,414

(22) Filed: May 9, 2017

(65) Prior Publication Data

US 2018/0019879 A1    Jan. 18, 2018

Related U.S. Application Data

(60) Provisional application No. 62/361,443, filed on Jul. 12, 2016.

(51) Int. Cl.
| | |
|---|---|
| G06F 21/00 | (2013.01) |
| H04L 9/08 | (2006.01) |
| G06Q 20/40 | (2012.01) |
| H04L 9/32 | (2006.01) |

(52) U.S. Cl.
CPC ......... *H04L 9/0838* (2013.01); *G06Q 20/401* (2013.01); *H04L 9/0891* (2013.01); *H04L 9/3236* (2013.01); *G06Q 2220/00* (2013.01); *H04L 2209/38* (2013.01); *H04L 2209/56* (2013.01)

(58) Field of Classification Search
CPC .................................................... H04L 9/0838
See application file for complete search history.

(56) References Cited

U.S. PATENT DOCUMENTS

| | | | |
|---|---|---|---|
| 6,671,804 B1 | 12/2003 | Kent | |
| 9,292,707 B1* | 3/2016 | Fontecchio | ......... H04L 63/0876 |
| 9,774,586 B1* | 9/2017 | Roche | ....................... H04L 63/08 |
| 9,947,008 B1* | 4/2018 | Camacho Diaz | ............................ G06Q 20/38215 |
| 9,992,028 B2* | 6/2018 | Androulaki | ............. G06F 21/64 |
| 10,164,779 B2* | 12/2018 | Uhr | ...................... H04L 63/0823 |
| 10,565,498 B1* | 2/2020 | Zhiyanov | ................ G06N 3/08 |
| 2010/0325441 A1* | 12/2010 | Laurie | ..................... G06F 21/31 713/185 |
| 2014/0337239 A1* | 11/2014 | Nawaz | ................ G06Q 50/265 705/75 |

(Continued)

OTHER PUBLICATIONS

List of IBM Patents or Patent Applications Treated as Related, May 9, 2017.

(Continued)

*Primary Examiner* — Harris C Wang

(57) ABSTRACT

One example method of operation may include receiving a request, from an entity, for one or more tokens based on one or more attributes, encrypting and masking the one or more attributes, adding the encrypted and masked one or more attributes to the one or more tokens, and transmitting the one or more tokens to the entity.

20 Claims, 11 Drawing Sheets

(56) References Cited

U.S. PATENT DOCUMENTS

| | | | | |
|---|---|---|---|---|
| 2015/0059003 A1* | 2/2015 | Bouse | ............... | G06F 16/2228 |
| | | | | 726/28 |
| 2015/0188898 A1* | 7/2015 | Chow | .................. | H04L 63/08 |
| | | | | 726/7 |
| 2016/0044035 A1* | 2/2016 | Huang | ............... | H04L 63/0272 |
| | | | | 726/4 |
| 2016/0283941 A1* | 9/2016 | Andrade | ............. | H04L 9/3247 |
| 2016/0342994 A1* | 11/2016 | Davis | ................ | G06Q 20/382 |
| 2017/0041296 A1* | 2/2017 | Ford | .................... | H04W 12/02 |
| 2017/0046698 A1* | 2/2017 | Haldenby | ............. | G06Q 40/08 |
| 2017/0111175 A1* | 4/2017 | Oberhauser | .......... | H04L 9/3236 |
| 2017/0155655 A1* | 6/2017 | Spaulding | ............ | H04L 63/107 |
| 2017/0195336 A1* | 7/2017 | Ouellette | ............... | G06F 21/41 |
| 2017/0228372 A1* | 8/2017 | Moreno | ........... | G06F 16/24522 |
| 2017/0366348 A1* | 12/2017 | Weimer | ................. | H04L 9/3247 |
| 2018/0019993 A1* | 1/2018 | Kravitz | .............. | H04L 63/0823 |
| 2018/0211055 A1* | 7/2018 | Balijepalli | ........... | H04L 9/0819 |
| 2018/0294962 A1* | 10/2018 | Kraemer | .............. | H04L 9/3221 |

OTHER PUBLICATIONS

David W. Kravitz, Title, Template-Based Distributed Certificate Issuance in a Multi-Tenant Environment U.S. Appl. No. 15/631,093, filed Jun. 23, 2017.
Adams et al.; "RFC 3161"; Aug. 2001; 26 pages.
Anonymous; QAI Transaction Certificate (TC); May 30, 2014.
Lewis, "A gently introduction to digital tokens" Sep. 28, 2015, 13 pages.
Nguyen et al., "Protocol Specification", GitiHub, May 20, 2016.

\* cited by examiner

TOKEN IDENTITY AND ATTRIBUTE MANAGEMENT

TECHNICAL FIELD

The present application is related to data management and, more specifically, to token identity and attribute management.

BACKGROUND

A time-sequenced immutable database, for example implemented using blockchain technology, is a distributed database that is implemented using a plurality of nodes. The nodes each maintain a copy of a sequentially growing list or ledger of data records or query one or more other nodes. An example of a blockchain implementation is a public ledger used for crypto-currency transactions. The data of a blockchain may be encrypted and may include data other than crypto-currency transactions, e.g., smart contracts may be implemented using a blockchain.

The functionality of blockchain technology has garnered much interest. However, widespread adoption of such technology has been hindered by reservations regarding anonymous transactions and a lack of clarity as to which entities are involved in a transaction, their past contributions to the database, and their authority to act in certain transactions.

SUMMARY

In one embodiment, one aspect of the application provides a method utilizing at least one processor to execute computer code that performs one or more of receiving a request for one or more tokens to be used by an entity, verifying that the entity is qualified to receive the one or more tokens for use on the multi-tenant transactional database, and responsive to the verifying, issuing, using the processor, the one or more tokens for use by the entity in association with a transaction, each of the one or more tokens comprising a function of a public key that corresponds to a private key associated with a token of the one or more tokens.

Another aspect of the application provides an apparatus comprising at least one processor and a computer readable storage medium having computer readable program code embodied therewith and executable by the at least one processor, the computer readable program code comprising one or more of computer readable program code that receives a request for one or more tokens to be used by an entity, computer readable program code that verifies that the entity is qualified to receive the one or more tokens for use on a database and computer readable program code that issues the one or more tokens for use by the entity in association with a transaction in the database. Each of the one or more tokens may comprise a function of a public key that corresponds to a private key associated with a token of the one or more tokens.

An additional aspect of the application provides a computer program product comprising a computer readable storage medium having computer readable program code embodied therewith that is executable by at least one processor, the computer readable program code comprising one or more of computer readable program code that receives a request for one or more tokens to be used by an entity, computer readable program code that verifies that the entity is qualified to receive the one or more tokens, and computer readable program code that thereafter issues the one or more tokens for use by the entity in association with a transaction. Each of the one or more tokens may comprise a function of a public key that corresponds to a private key associated with a token of the one or more tokens.

A further aspect of the application provides a method for token management in a multi-tenant transactional database, comprising utilizing at least one processor to execute computer code that performs one or more of receiving, at a database management device, a request for one or more tokens to be used by an entity, verifying, using a processor associated with the database management device, that the entity is qualified to receive the one or more tokens for use on the multi-tenant transactional database, the verifying comprising inspection of an enrollment certificate, wherein issuance and consequent availability of the enrollment certificate requires proof of identifying characteristics of the entity; responsive to the verifying, issuing, using a processor associated with the database management device, the one or more tokens for use by the entity in association with a transaction in the multi-tenant database, each of the one or more tokens comprising a function of a public key that corresponds to a private key associated with a token of the one or more tokens, receiving, by the database management device, a request pertaining to the entity; using, by the database management device, enrollment information that is contained within the enrollment certificate associated with the entity to identify a plurality of transactions, forming, by the database management device, a response to the request pertaining to the entity and issuing, by the database management device, the response to one or more requesting entities.

Another aspect of the application provides a method for token management in a multi-tenant transactional database, comprising utilizing at least one processor to execute computer code that performs one or more of obtaining access information regarding an entity to inspect tokens stored on the multi-tenant transactional database, using the access information to inspect the tokens stored on the multi-tenant transactional database and thereafter obtaining a response comprising data relating to one or more transactions of the entity linked by the access information and the one or more tokens stored on the multi-tenant transactional database.

Another aspect of the application provides a method that includes one or more of receiving a request, from a user device, for one or more tokens based on one or more attributes, selecting an attribute, generating a masking and attribute encryption key, encrypting and masking the attribute, adding the attribute to a token, and transmitting the token and attribute root key to the user device.

Another aspect of the application provides a method that includes one or more of receiving a request, from an entity, for one or more tokens based on one or more attributes, encrypting and masking the one or more attributes, adding the encrypted and masked one or more attributes to the one or more tokens, and transmitting the one or more tokens to the entity.

Still yet a further example embodiment may include a receiver configured to receive a request, from an entity, for one or more tokens based on one or more attributes, a processor configured to encrypt and mask the one or more attributes, add the encrypted and masked one or more attributes to the one or more tokens, and a transmitter configured to transmit the one or more tokens to the entity.

Yet still another example embodiment may provide a non-transitory computer readable storage medium configured to store instructions that when executed cause a processor to perform receiving a request, from an entity, for one or more tokens based on one or more attributes, encrypting and masking the one or more attributes, adding the encrypted and masked one or more attributes to the one or more tokens, and transmitting the one or more tokens to the entity.

The above embodiments and aspects may relate to token management, to token management utilizing a database and to token management in a multi-tenant transactional database.

DETAILED DESCRIPTION

Figure 1:
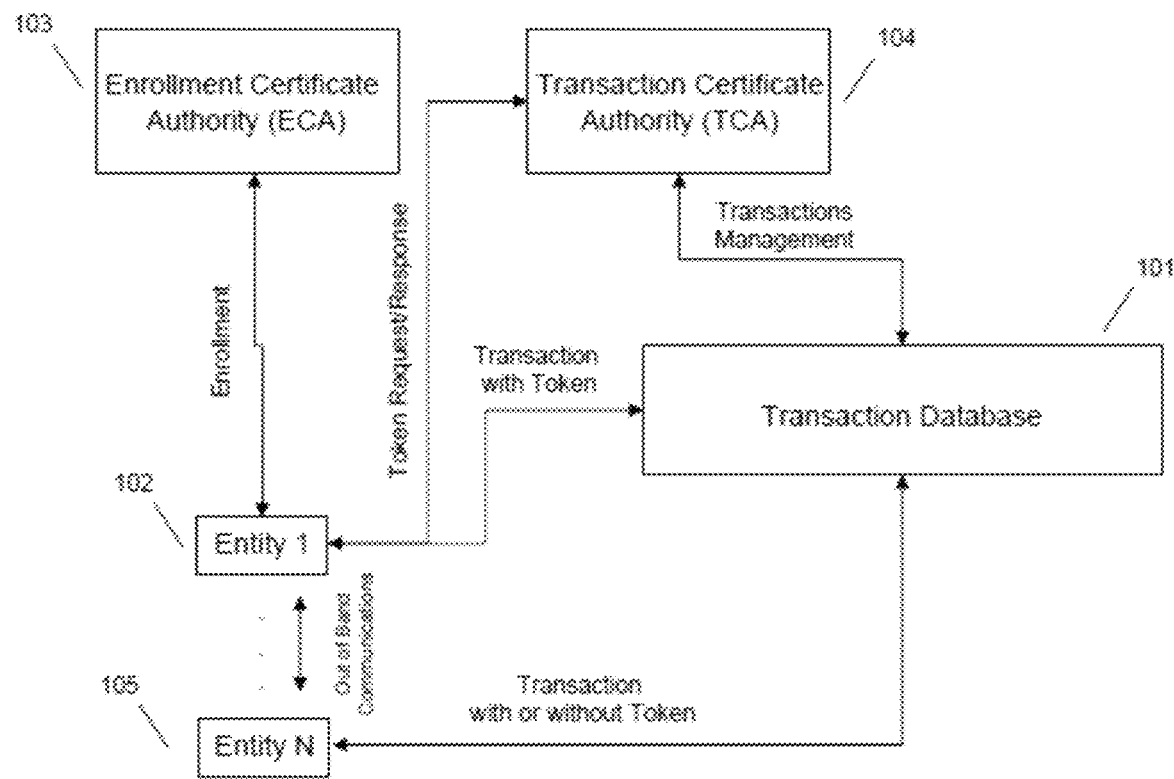
FIG. 1 illustrates an example system overview according to an example embodiment.

It will be readily understood that the components of the embodiments of the application, as generally described and illustrated in the figures herein, may be arranged and designed in a wide variety of different configurations in addition to the described exemplary embodiments. Thus, the following more detailed description of the embodiments of the application, as represented in the figures, is not intended to limit the scope of the embodiments of the application, as claimed, but is merely representative of exemplary embodiments of the application.

Reference throughout this specification to "one embodiment" or "an embodiment" (or the like) means that a particular feature, structure, or characteristic described in connection with the embodiment is included in at least one embodiment of the application. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the application. One skilled in the relevant art may well recognize, however, that embodiments of the application can be practiced without at least one of the specific details thereof, or can be practiced with other methods, components, materials, et cetera. In other instances, well-known structures, materials, or operations are not shown or described in detail to avoid obscuring aspects of the application.

The illustrated embodiments of the application will be best understood by reference to the figures. The following description is intended only by way of example and simply illustrates certain selected exemplary embodiments of the application as claimed herein. It should be noted that the flowchart and block diagrams in the figures illustrate the architecture, functionality, and operation of possible implementations of systems, apparatuses, methods and computer program products according to various embodiments of the application. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

It is desirable to expand the use of time-sequenced immutable databases, for example ones that are constructed using blockchain technology, beyond digital currency transactions and asset transfers that are conducted anonymously or pseudonymously. However, traditional methods of dealing with business requirements (such as knowing the customer) are seemingly incompatible with making effective use of such blockchains.

Hardening of a blockchain database for B2B—business to business, bank to bank, and bank to business—transactions introduces a requirement that membership services are adequately addressed. This entails reconciling the apparently conflicting goals of (a) maintaining privacy (e.g., by customizing release of information about transacting parties and securing knowledge of which transactions cluster, e.g., according to having one or more transacting parties in common) and (b) meeting business security needs associated with controlling access to proprietary information while still effectively conducting business and accommodating all industry and regulatory requirements (including routine audits and compliance with authorized regulatory or related activities).

Well-known blockchain technologies have been designed without an underlying identity management backbone.

Thus, an embodiment provides an identity, attribute and reputation management framework that is fully compatible with blockchain based databases. An embodiment furthermore uses transactions on the blockchain as a feedback mechanism to manage reputations going forward. In an embodiment, tokens are attached to transactions so that automated processing via blockchain logic can analyze the tokens of a transacting entity, e.g., to determine whether contractual requirements have been met. The structure of such tokens is tailored to flexibly accommodate varied policies while efficiently handling key management and minimizing the need for out-of-band communications.

Referring now to FIG. 1, an entity 102 (e.g., business, individual) may use a client device to request one or more tokens for use in transacting on a transaction database 101, e.g., blockchain. A token request includes a request by a member or authenticated entity (TCertOwner herein), e.g., an entity that has been issued an enrollment certificate by an enrollment certificate authority 103 (ECA herein).

A request for tokens, specifically for a token embodying a transaction certificate (TCert herein) generated by a transaction certificate authority 104 (TCA) includes an enrollment certificate issued to the entity, which in turn includes an enrollment identification (EnrollID herein). The enrollment identification is proven to, e.g., the ECA 103, during an enrollment phase.

The entity's 102 request for tokens is signed using an enrollment private key (EnrollPriv_Key herein), where the enrollment public key (EnrollPub_Key herein) is included in the enrollment certificate obtained from the ECA 103. The request includes the requested batch size, i.e., a number of tokens with TCerts to be generated and delivered. The requested batch size may or may not be included in the request, and the requested batch size may or may not be honored by the TCA 104.

The TCA 104 will evaluate the request and issue a response to the entity 102. If the 102 entity is permitted to receive token(s), as determined for example from evaluation of the entity's identification information, reputation score, attributes, etc., as further described herein, the TCA 104 will issue token(s) in response to the request. The TCA's 104 response includes a batch of tokens with TCerts, and a key derivation function (KDF) key, TCertOwner_KDF_Key herein, which is a key generated by applying the keyed-hash message authentication (HMAC) algorithm or construction using a key, TCA_HMAC_Key herein, which is generated by or otherwise available to the TCA 104 (and appropriate delegates). Hence TCertOwnerKDF_Key is generated as HMAC(TCA_HMAC_Key, EnrollPub_Key), where the notation HMAC(K, 'text') denotes the application of the HMAC function to 'text' using key K, where a cryptographic hash function such as SHA-384 may be used as the underlying one-way hash function that is called by the HMAC algorithm. If SHA-384 is used in this capacity, then the resultant TCertOwnerKDF_Key may be considered to be a key of bit-length equal to 384. This TCertOwnerKDF_Key is delivered to the entity 102 by the TCA 104 within a response to a request for the batch of tokens. Here, TCertOwnerKDF_Key is applied within a key derivation function (KDF), e.g., based on HMAC or other key derivation technique to derive additional keying material from the secret key, TCertOwner_KDF_Key.

Additional keying material derived using TCertOwner_KDF_Key includes TCertOwnerEncrypt_Key, a 256-bit key used by the TCA 104 to generate an encrypted field of the token with TCert that can be decrypted by the entity 102, and Expansion_Key, a 384-bit key that is used to generate a 384-bit ExpansionValue. The TCertOwnerEncrypt_Key is an encryption and decryption key obtained by a key derivation function, e.g., as [HMAC(TCertOwner KDF_Key, "1")]256-bit truncation, where "1" is some representation of the integer 1 and the truncation extracts 256 bits of the 384 bits that comprise HMAC(TCertOwner KDF_Key, "1"). Expansion_Key is obtained by a key derivation function, e.g., as HMAC(TCertOwnerKDF_Key, "2"), where "2" is some representation of the integer 2 as distinct from "1". A transaction certificate index, TCertIndex herein, is preferably comprised of the concatenation of (i) a timestamp (assigned by the TCA 104), (ii) a value that is randomly or pseudo-randomly generated by the TCA 104, and (iii) a counting mechanism (e.g., a counter reinitialized to 1 for each new batch of tokens). ExpansionValue is generated as HMAC(Expansion_Key, TCertIndex). In order to enable a token with TCert to optionally include means to allow targeted release of certain data fields incorporated into the token with TCert, a 384-bit TCertInfoExportKDF_Key can be generated as HMAC(TCertOwnerKDF_Key, "3"), where "3" is some representation of the integer 3 as distinct from "1" and "2". HMAC(TCertOwnerKDF_Key, "3") can be used to generate one or more keys, each of which can be used to encrypt one or more data fields. For example, a 256-bit EncryptEnrollID_Key derived as [HMAC(TCertInfoExportKDF_Key, TCertID "1")]256-bit truncation]] can be used for targeted release of EnrollID if EnrollID appears within a token with TCert as AES_EncryptEncryptEnrollID_Key(EnrollID), that is, as an encryption of the EnrollID value where such encryption is executed using the advanced encryption standard (AES) algorithm with key EncryptEnrollID_Key.

The token's transaction certificate (TCert) basic structure enables a digital signature generation capability for the entity 102 that is used for (or in association with) transacting on the transaction database 101. For example, the basic structure includes a transaction certificate identification (herein TCertID), which is preferably unique to the TCert. Further included is an encrypted field referred to as AES_EncryptTCertOwnerEncrypt_Key(TCertIndex_|EnrollPub_Key|EnrollID), where the value comprised of the string TCertIndex|EnrollPub_Key|EnrollID, where denotes concatenation is operated upon using an encryption algorithm. This field is generated using the key TCertOwnerEncrypt_Key with an encryption algorithm (e.g., AES algorithm).

The basic structure also includes a capability of the TCA 104 to cluster or link (i.e., identify or associate) transactions made by a transacting entity 102 using the token(s). For example, the structure includes the result of using an AES encryption key that is generated by or otherwise available to the TCA 104 (and appropriate delegates), TCA_Encrypt_Key herein, that is used to encrypt the TCertIndex, EnrollPub_Key and EnrollID, i.e., as AES_EncryptTCA_Encrypt_Key(TCertIndex|EnrollPub_Key|EnrollID). This permits the TCA 104 to use TCA_Encrypt_Key for access to TCertIndex, EnrollPub-Key, and EnrollID to identify transactions linked to entity's 102 issued tokens.

Further, a transaction certificate public key (TCertPub_Key herein) or a function thereof is included in the basic structure, and a validity period mechanism may be included (ValidityPeriodCtr herein), which may include an increasing counter that is updatable by the TCA 104 via the blockchain (transaction database 101) or other mechanism; such counter may be used in lieu of date or time intervals.

An entity's 102 enrollment identification (EnrollID) may be released by the entity 102 by encrypting the aforementioned EncryptEnrollID_Key using a key available to the intended recipient, if the TCA 104 has included within the token with TCert the aforementioned AES_EncryptEncryptEnrollID_Key(EnrollID). The TCA 104 may, for purposes of auditability, encrypt TCertIndex, EnrollPub_Key, and/or EnrollID (alone, in combination, or in part), in order to gain or grant access to transaction information without necessarily requiring the use of TCA_Encrypt_Key or TCA_HMAC_Key.

The TCA 104 delivers the requested tokens to the entity 102 or makes them otherwise available and the entity 102 may examine the enrollment identification, in this example, AES decryption of: AES_EncryptTCertOwnerEncrypt_Key (TCertIndex|EnrollPub_Key|EnrollID) to determine if one or more of the tokens is valid, i.e., whether or not the enrollment identification included is that of the requesting entity 102. If valid, the receiving entity 102 may use one or more of the tokens in transacting on the transaction database 101 by digitally signing using one or more of the TCertPriv_Key values as signature generation private keys. This is possible because TCertPriv_Key, which is computable by TCertOwner entity 102 using TCertOwnerKDF_Key (retrieved from the token batch response) and generated/stored EnrollPriv_Key, is equal to (EnrollPriv_Key+ExpansionValue) modulo n, where n may defined by a known specification and where TCertIndex, extracted via AES decryption of: AES_EncryptTCertOwnerEncrypt_Key (TCertIndex|EnrollPub_Key|EnrollID) is usable to recover ExpansionValue if properly generated as HMAC(Expansion_Key, TCertIndex). Expansion_Key is recoverable using TCertOwnerKDF_Key, where e.g., Expansion_Key is equal to HMAC(TCertOwnerKDF_Key, "2"). It is possible for other entities, e.g., entity N 105, to likewise receive entity-specific tokens, i.e., via completing an enrollment process via ECA 103 and receiving a batch of tokens from TCA 104. However, in an embodiment, it is not required that the entities 102, 105 use the tokens on the database. Not using the tokens, however, may negatively impact an entity's ability to establish membership/enrollment, and will preclude the entity from taking part in attribute and reputation management, as further described herein. As such, other entities may not be willing to transact with an entity that uses transaction database 101 without proper tokens. In an embodiment, transaction database 101 may be a closed system, i.e., requiring tokens for transactions to be placed therein.

In addition to the basic TCert fields included in the token structure, additional fields may be included. For example, the TCA 104 and/or appropriate delegate may wish to look at specific transactions (e.g., in order to obtain a reputation score included in a token, in order to obtain an attribute included in a token, etc.) or to link specific transactions, e.g., transactions involving a given entity 102 or set of entities. For example, TCA 104 may wish to look at specific transactions in order to compile a reputation score and/or attribute(s) by examining a series of transactions submitted by or otherwise involving the entity as a party to a transaction, e.g., entity 102. An entity may submit a transaction that includes TCerts in addition to its own as a means, for example, of specifying which entities are authorized to invoke the transaction in order to perform certain operations, for example, such as to execute code included within and/or referenced by the transaction. Such invocation may entail one or more entities submitting a transaction that is digitally signed using TCertPriv_Key that corresponds to TCertPub_Key contained within a TCert that has been included within the transaction that is now being invoked. Attributes and/or reputation scores may be incorporated into a TCert as AES_EncryptEncryptAttributes_Key(Attribute(s) Reputation Score(s)), where, for example, EncryptAttributes_Key is generated as [HMAC(TCertInfoExportKDF_Key, TCertID "2")]256-bit truncation.

Figure 2A:
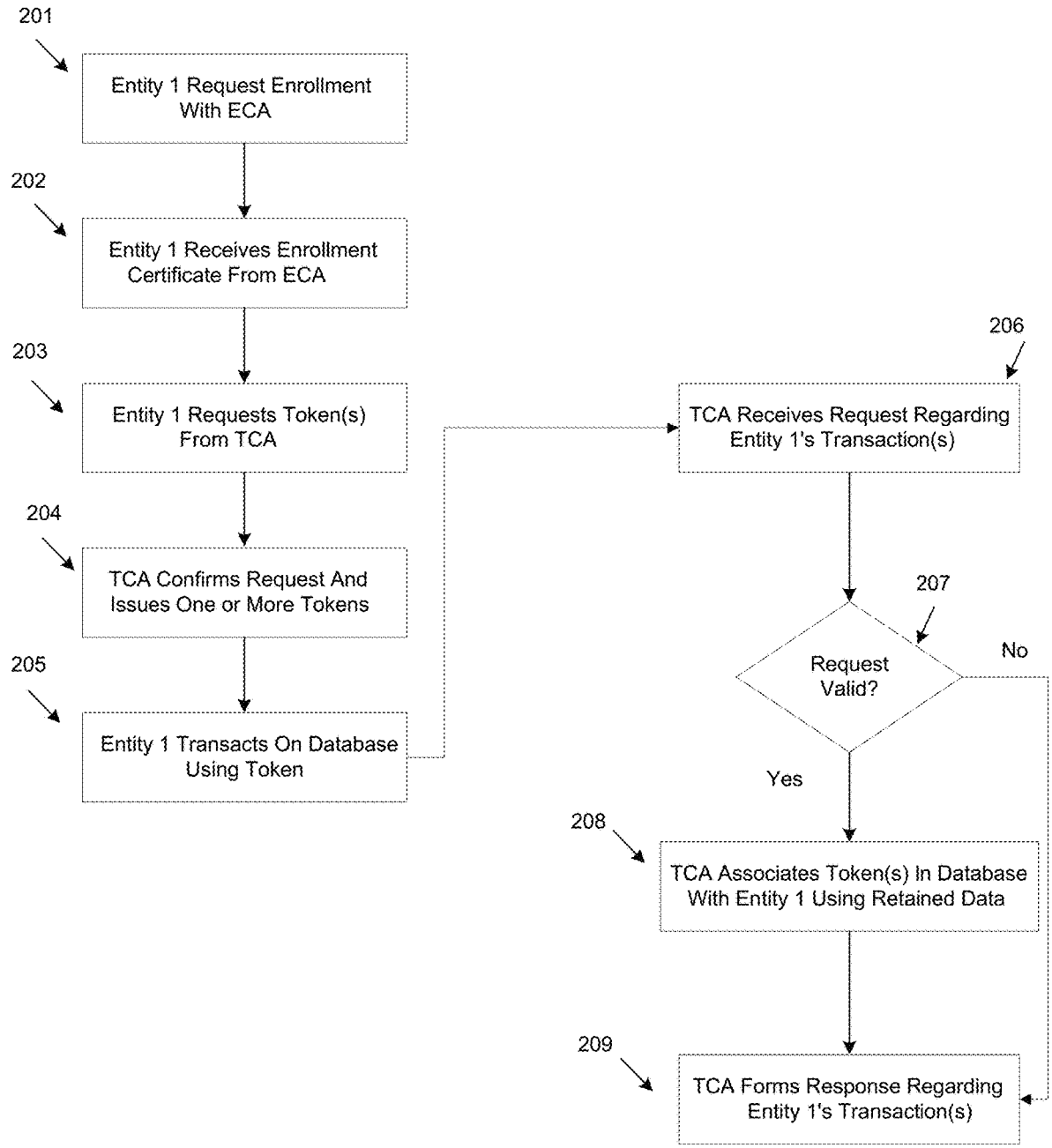
FIG. 2A illustrates an example of using tokens for distributed transaction database identity, attribute and reputation management according to an example embodiment.

Referring to FIG. 2A, an embodiment implements a method wherein an entity, in this example Entity 1, requests enrollment with an ECA (e.g., ECA 103) at 201. Entity 1, if satisfying enrollment criteria of the ECA, receives an enrollment certificate from the ECA at 202. Then, Entity 1 may request token(s) from the TCA at 203. If the TCA grants the request, including for example confirming with the ECA, and/or via use of the enrollment certificate, that Entity 1 has proven its identity and is authorized to receive token(s), the TCA will confirm the request and issue one or more tokens to Entity 1 at 204. Entity 1 then may transact on the transaction database using the tokens, as illustrated at 205.

As illustrated in FIG. 2A, a request and response may be implemented in order for the TCA to obtain the transaction data, e.g., entity identification, attributes, reputation scores, etc., of an entity, e.g., over some previous period of time. If the TCA receives a request at 205, for example a request for the last X transactions by Entity 1, and the TCA confirms it is a valid request at 207 (e.g., issued by an appropriate entity or authority having access to such information), the TCA and/or its delegate can systematically associate and store the transaction identifications clustered by EnrollPub_Key of Entity 1. This clustering or linking of Entity 1's transactions at 208 further enables the auditing and evaluation (e.g., reputation scoring) of the entity by the TCA (or appropriate delegate) and/or permits identification of, and conditional authorizing and processing of, an entity's transactions on the blockchain. Thus, TCA may issue a response to the request at 209. If TCA deems the request is not valid at 207, a response in the form of denying the request may be sent at 209. One entity may authorize another entity to make requests on its behalf. One such means to authorize is via submitting a transaction to the transaction database or blockchain. Such a transaction may be signed using TCertPriv_Key corresponding to TCertPub_Key of a TCert that is included with or referenced by the transaction, and may include an additional TCert owned by the party to the transaction to which authorization to make a request to the TCA on behalf of or as a delegate of the transaction-submitting entity is being granted. The TCA's verification of the legitimacy of such an ensuing request can entail accessing the authorizing transaction in order to determine which entity's information to release and to determine whether the requesting entity is the same entity as that designated by the authorizing transaction as an authorized entity. This determination can be based on matching the EnrollID included (explicitly as plaintext or as an argument of a hash function or encryption algorithm) within the enrollment certificate used to make the request to the TCA against the EnrollID included as: AES_EncryptTCA_Encrypt_Key(TCertIndex-|EnrollPub_Key|EnrollID) within a TCert that is in the authorizing transaction as being granted access as a delegate. If the EnrollID appears as an argument of a hash function within the enrollment certificate, for example as hash(randvalue|EnrollID), where randvalue is a randomly or pseudo-randomly generated value that precludes guessing EnrollID given hash(randvalue|EnrollID), then entity 102 can provide TCA with access to randvalue and EnrollID when requesting a batch of TCerts. TCA can check that these provided values of randvalue and EnrollID hash to the hash(randvalue|EnrollID) field within the enrollment certificate. If the TCA and/or appropriate delegate wishes to obtain plaintext content or chain code (if all or part thereof is encrypted by an entity), the TCA may utilize its retention or derivation of EnrollPub_Key, i.e., the public key used by a particular entity (e.g., Entity 1 in the example of the FIG. 2A), to identify the entity. If attributes and reputation scores (or other data of interest) are incorporated into tokens with TCerts, it becomes reasonable for the TCA (or whichever entity that is responsible for assigning reputation scores) to be able to directly access plaintext chain code or query those that have such direct access. In either case, the TCA can directly access the attributes and reputation scores (although these may be in encrypted form within the TCerts) if the tokens with TCerts are placed outside of the boundary of the encrypted chain code. Although the attributes and/or reputation scores may be in encrypted form within the TCerts, the TCA and/or its delegates can access the plaintext form of such attributes and/or reputation scores because of the ability to access the key used for the encryption.

In order to grant application-specific access to plaintext chain code, it may be preferable not to rely entirely on enforcement at the client application level. Such reliance would preclude the ability for appropriate entities (e.g., TCA and/or delegates) to inquire and have these inquiries completed, e.g., if a transacting entity (e.g., entity 102 of FIG. 1) has the entity's local client deny access. The TCerts may include a field of signature verification public keys and/or of hashed signature verification public keys so that chain code validators or auditors (or other appropriate entity) that are granted direct access to chain code can determine from whom they should accept such queries for decrypted chain code. If the TCA is not granted direct access or it is otherwise determined or set by the system not to allow the TCA to unilaterally decide which entities are to be granted indirect access via query, then this field of signature verification public keys and/or of hashed signature verification public keys can be signed by another, e.g., by the ECA (103 of FIG. 1) or whichever access manager entity has been designated by the system with this responsibility. This signed field can be specific to a particular EnrollID. This field can differ according to the validity period of the TCerts. For example, an auditor may be granted access to see future plaintext chain code corresponding to a particular Enroll ID (e.g., after first being given direct access by the TCA to all or part of decrypted TCerts, and then providing justification for receiving more in-depth access). The TCA can revoke an entity's tokens with TCerts for the current validity period and issue a new TCert batch that incorporates a signature verification public key for which the auditor knows the corresponding signature generation private key. The signed field of hashed signature verification keys can include faux keys so as to not leak which or how many signature verification keys correspond to signature generation private keys are actually held. The signature verification key associated with a given agency can change over time as well in order to further obfuscate the process.

As a specific example of a signature verification, a TCert field may be included as SignAccessManagerPriv_Key ({SignatureVerificationPub_Key}), where each SignatureVerificationPub_Key or hash(SignatureVerificataionPub_Key) is included in addition to the signature generated by the Access Manager over the set of SignatureVerificationPub_Keys as denoted by {SignatureVerificationPub_Key}. Any of the corresponding signature generation private keys can be used to sign queries directed to such TCert, e.g., to receive plaintext of encrypted transaction content/chain code. The signature of such signed query is verified using one of the SignatureVerificationPub_Keys within the set of SignatureVerificationPub_Keys. Such request and response communications can be done using, e.g., a secure protocol such as the TLS protocol, where the supplier of responses to queries is authenticated using its TLS certificate.

By way of further example, a TCert may include attributes and/or reputation scores that an entity, the TCA 104, etc., may wish to access. A TCert may thus include an encrypted field containing such data, e.g., AES_EncryptEncryptAttributes_Key(Attribute(s)|Reputation Score(s)) where the TCA and/or appropriate delegate(s) retains or has access to the key, here EncryptAttributes_Key, as does the TCert owner (i.e., the entity, such as entity 102 of FIG. 1, using the token in association with the transaction(s)), and where EncryptAttributes_Key can be made available to additional entities. For example, EncryptAttributes_Key can be made available within a transaction that is signed using an entity's private key, i.e., TCertPriv_Key, as an encryption that provides EncryptAttributes_Key to the targeted entities via decryption using an appropriate key. A possible expression for EncryptAttributes_Key is: [HMAC(TCertInfoExport KDF_Key, TCertID|"2")]256-bit truncation. Attribute(s), reputation score(s), or a part thereof, can also be encrypted by the TCA with additional key(s) for more fine-grained dissemination. For example, an entity that has access to TCertInfoExportKDF_Key for a particular entity would be able to decrypt all AES_EncryptEncryptAttributes_Key(Attribute(s) Reputation Score(s)) contained within TCerts owned by that entity, while attributes and/or reputation score(s) may be selectively encrypted whereby some but not all TCerts owned by a particular entity include AES_EncryptKey*(Attribute(s) Reputation Score(s)) for some key Key* provided to an entity.

Attributes and/or reputation scores may alternatively be provided in unencrypted form, e.g., where attributes are not considered sensitive information and attribute-reputation score combinations do not enable unwanted clustering by observers according to the same TCertOwner. A reputation score may be relative to specific attribute(s).

A TCert may include a field that permits the TCA 104 and/or appropriate delegate to revoke the token(s). By way of specific example, inclusion of a field such as Hash (TCertID, revocK), where revocK may differ per entity and per validity period, enables relying parties to detect whether a given token with TCert has been revoked by computing Hash(TCertID, revocK) for those values of revocK that are marked within a revocation list as being associated with the same ValidityPeriodCtr value (or validity period date-time interval) as that included within the TCert of interest, and comparing the results for a match against the value of Hash(TCertID, revocK) included within the TCert of interest. Revocation lists or sub-lists within a revocation list may be partitioned or indexed according to ValidityPeriodCtr (or validity period date-time interval) of the revoked TCerts. Revocation lists may be incorporated into a blockchain and each may be restricted to a ValidityPeriodCtr range (or a minimum start date-time and maximum end date-time) to limit the size of the revocation list. The hash function may be SHA-384 or a suitable alternate.

Possible reasons for revoking a batch of currently valid TCerts that were issued using a common revocK value include but are not limited to: the reputation score(s) are no longer valid; the TCertOwner (e.g., entity 102 of FIG. 1) enrollment certificate has been revoked by the ECA (103 of FIG. 1) (or its delegate); and/or the TCA (104 of FIG. 1) has reason to issue a new batch of TCerts for that TCertOwner that provides access to certain TCert fields and/or authorizes queries to a different set of auditors than in the previous batch (as discussed in connection with signature verification fields herein). A change-over from one ValidityPeriodCtr value to a new or next ValidityPeriodCtr value (or equivalently the expiration of a ValidityPeriodCtr value) can be announced on the blockchain by the TCA or its delegate by having the TCA submit such a transaction to the blockchain. Such a transaction can be signed by the same private key that the TCA uses to generate TCerts.

The entity (e.g., 102 of FIG. 1) public key for a particular token, herein TCertPub_Key, is computable by the TCA and/or appropriate delegate using the stored TCA_H-MAC_Key and EnrollPub_Key extracted from the entity's (TCertOwner) enrollment certificate that is included in the request for tokens. TCertPub_Key is equal to (EnrollPub_Key+ExpansionValue G), e.g., using elliptic curve scalar multiplication (with scalar ExpansionValue and curve point G, and elliptic curve point addition, e.g., per known specification). TCertPriv_Key, which is computable by TCertOwner using TCertOwnerKDF_Key (retrieved from the token batch response) and generated/stored EnrollPriv_Key, is equal to (EnrollPriv_Key+ExpansionValue) modulo n, where n may defined by a known specification. The TCertOwner need not retain TCertPriv_Key, since it is computable from the TCert.

The entity (e.g., 102 of FIG. 1) may use TCertPriv_Key corresponding to TCertPub_Key within a TCert to digitally sign a chain code/transaction content that includes, in particular, an encryption public key or key agreement public key for which the entity has or can retrieve the corresponding decryption private key or key agreement private key. The entity may use a TCert to disseminate on the blockchain an encryption public key or key agreement public key that is usable by the entity or another entity, e.g., entity N 105 of FIG. 1, to make a key accessible to encrypt data. The key that is used to encrypt data is made accessible by encrypting that key using the encryption public key or by encrypting that key using a key that is derived from a shared secret value that results from using the key agreement public key in a suitable key agreement protocol. This enables an entity (e.g., entity 102 of FIG. 1) to decrypt the encrypted data in order to recover the plaintext form, i.e., usable form, of the data. Such encryption public key or key agreement public key is preferably generated using a method that is the same as or similar to that used to generate the TCertPub_Key, using an index value that is the same as or related to the TCertIndex value within the TCert that accompanies the signed chain code/transaction content.

Rather than generating such key agreement public key as (EnrollPub_Key+Expansion Value G), where Expansion Value is determined from Expansion_Key=HMAC(TCertOwnerKDF_Key, "2") and some value of TCertIndex, such key agreement public key can be generated as follows.

In place of EnrollPriv_Key and corresponding EnrollPub_ Key, the entity (e.g., entity 102 of FIG. 1) may use an independently generated long-term private key and corresponding long-term public key. In place of Expansion_Key=HMAC(TCertOwnerKDF_Key, "2"), the entity may use an independently generated long-term HMAC key. Alternatively, EnrollPriv_Key and corresponding EnrollPub_Key, and Expansion_Key can be reused for this purpose if, for example, the TCA uses only odd values for the TCertIndex counter when generating tokens with TCerts so that the even values of TCertIndex are reserved for the key agreement private and public keys, such as elliptic curve Diffie-Hellman (ECDH) private and public keys. This technique enables the entity to reconstruct the key agreement private key by viewing the transaction on the blockchain where, for example, the index used for the ECDH key is one higher than the TCertIndex of the TCert. More generally, this technique or a similar technique enables the entity to reconstruct the decryption private key or key agreement private key by viewing the transaction on the blockchain.

As an example, two entities, e.g., entity 102 and entity 105 of FIG. 1, that want to communicate with one another as determined based on the attributes and/or reputation scores, which may appear in the clear within the TCerts of each, and want to communicate securely using encrypted data, may use dissemination on the blockchain of an encryption public key or key agreement public key. As another example, where a first of two entities (e.g., entity 102 of FIG. 1) is aware by some means of an encryption key or key agreement public key of the second of the two entities (e.g., entity 105 of FIG. 1), the first entity may use the encryption key or key agreement public key of the second entity (here, the intended recipient) to securely provide access to the first entity's attributes, reputation scores, EnrollID, or any other data of interest, so that the second entity can decide whether to communicate with the first entity, where such communications may occur on and/or off of the blockchain (such out of band communications are illustrated in FIG. 1 as directly between the entities, i.e., not necessarily involving transaction database 101). If the second entity decides to communicate with the first entity, the second entity can do so using the encryption public key or key agreement public key that was provided by the first entity within the transaction that provided the second entity with access to the first entity's attributes, reputation scores, EnrollID, or any other data of interest.

An entity, e.g., entity 102 of FIG. 1, may wish to switch to another TCert for use in transacting, e.g., switch from a first TCert to a second TCert. For example, entity 102 may wish to do so for example in the case where the first TCert has expired, i.e., the current ValidityPeriodCtr value is higher than that within the first TCert, or entity 102 may wish to obscure the fact that a future invocation of the chain code is done by the same entity that earlier deployed or invoked the chain code (where in this case, the second TCert may be incorporated into the encrypted portion of the chain code rather than being exposed). More specifically, if entity 102 wishes to hide which future invocation(s) is done by that entity, entity 102 introduces or incorporates a preferably previously unused TCert into the encrypted portion of the chain code (by proving ownership via signature of the newly introduced TCert as well as of one that is available in the clear outside of the ciphertext). The newly introduced TCert does not appear in the clear unless and until entity 102 does a future invocation that involves digitally signing using the TCertPriv_Key that corresponds to the TCertPub_Key within that particular TCert. The two TCerts are un-linkable except through either (a) access to the plaintext of the transaction that did the TCert switch-over or (b) access (by the TCA or an auditor) to the hidden information within the two TCerts that shows they belong to the same entity (e.g., same user, organization, device, or plurality thereof).

A mechanism for such switching is to have entity 102 provide two signatures, i.e., a first signature that is generated using the TCertPriv_Key of the first TCert, and a second signature that is generated using the TCertPriv_Key of the second TCert. Alternatively, entity 102 may provide a single digital signature that is generated using the modulo n sum of the two TCertPriv_Keys (i.e., of the first and second TCert), where this signature can be verified using the elliptic curve point addition of the two corresponding TCertPub_Keys.

If an entity places TCerts outside of the chain code portion, if any, that is submitted in encrypted form, this enables access to the TCerts without requiring access to the plaintext chain code. As above, this provides for the TCA and/or appropriate delegate to access these data without accessing the plaintext. All parties to a transaction (whether or not they have actually transacted on the blockchain) are represented by a TCert. This enables queries to the TCA or its delegate, say for last month's transactions to which a particular entity has been a party, to be fully addressed. The one (potentially temporary) exception to placing a TCert in the clear (without adversely impacting ability to query) is to hide a pattern of chain code invocations, as above. The representation of an entity to a transaction by a TCert may be indirect in that an entity may include a signature verification public key within a transaction to be used for a specific role. For example, entity 102 may delegate calendar invites corresponding to entity 102 to be handled by an administrative assistant. A device used by such administrative assistant can generate a signature generation private key and corresponding signature verification public key, and provide the signature generation public key to entity 102 so that entity 102 can include that public key within a role delegation transaction. In an alternative embodiment, entity 102 can generate a signature generation private key and corresponding signature generation public key to be included within a role delegation transaction submitted by entity 102, where the signature generation private key is provided to a device used by the administrative assistant.

Automated chain code processing can check for a match, e.g., between a request for service with conditions relative to required attributes and/or reputation scores, and a response by an entity claiming to meet such criteria. For example, such a request may be received as the request to the TCA (or appropriate delegate) at 206 of FIG. 2A, with follow-on processing as described herein to determine the response at 209.

Where the description provided herein references an ECA (e.g., ECA at 103 of FIG. 1), it is to be understood that such enrollment certificate authority functionality can be split between an enrollment registration authority and an enrollment certificate authority, where an entity (e.g., entity 102 of FIG. 1) communicates directly with the enrollment registration authority, and the enrollment registration authority communicates directly with the enrollment certificate authority that handles actual issuance of enrollment certificates. A TCA (e.g., TCA 104 of FIG. 1) can be similarly split into a transaction certificate registration authority and a transaction certificate authority.

Where the description provided herein references an entity 102 requesting a batch of TCerts from a TCA, it is to be understood that a TCA can use its knowledge of TCA_Encrypt_Key and TCA_HMAC_Key, and of EnrollPub_Key and EnrollID specific to entity 102, in order to generate a batch of TCerts without necessarily processing a specific request from entity 102.

Where the description provided herein references a TCA, it is to be understood that there may be multiple such TCAs, wherein one or more such TCAs may be limited relative to the types of attributes for which it is authorized to issue TCerts and/or may be limited as to which entities or entity types (such as divided into classes of EnrollIDs) it is authorized to issue TCerts. An entity may be allowed to receive batches of TCerts from multiple such TCAs. When submitting a transaction, an entity may be allowed to incorporate multiple TCerts that it owns, potentially issued by two or more distinct TCAs. An entity can sign such a transaction using each of the TCertPriv_Keys to generate distinct signatures. Alternatively, an entity can sign such a transaction using a combination of the TCertPriv_Keys, such as the modulo n sum of such keys.

Figure 2B:
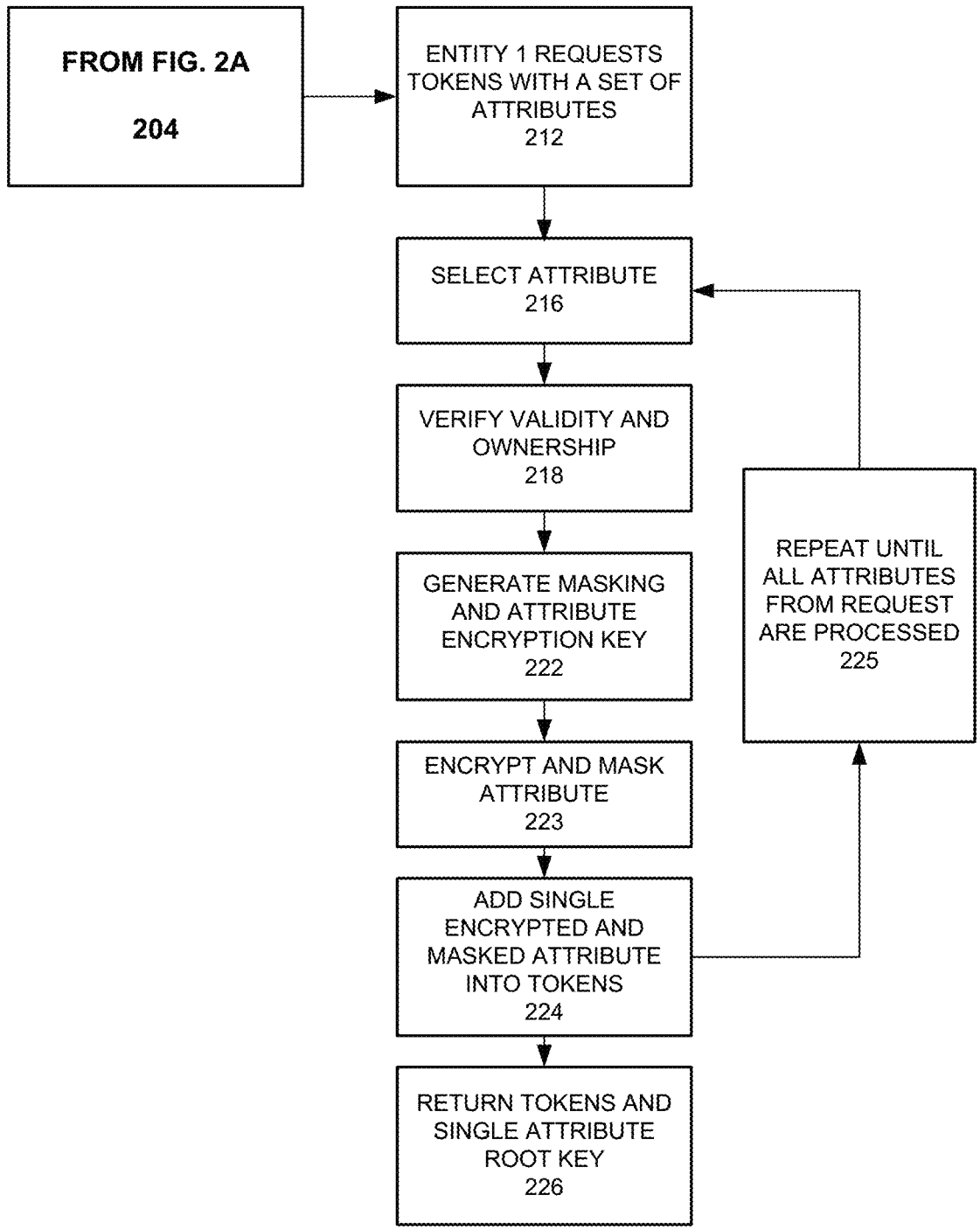
FIG. 2B illustrates an example of a user requesting tokens according to an example embodiment.

FIG. 2B illustrates an example flow diagram of a user requesting tokens. Referring to FIG. 2B, further from the operation 204 of FIG. 2B, the entity 1 may request tokens with a set of attributes 212. The request may include various information. The attribute can be selected 216 and the validity and ownership of the attribute can then be verified against the requesting user device 218. The masking and attribute encryption key is generated 222 and the attribute is encrypted and masked accordingly 223. The individual encrypted and masked token can then be added 224 and the process is completed for all attributes requested 225. The tokens corresponding to the attributes are established based on a root key 226 which can be shared with the verified device. In the attribute example of a 'position', the position=manager, the attribute value may be shared by masking and encrypting the attribute and then sharing the key to decrypt the value. For example, if a question was raised, "Are you a Director?", the key needed to answer that question can be released and the entity asking the question will not learn the actual value of the attribute but will receive a yes/no type answer. An attribute is any item of information related to the identity of the entity requesting the tokens. An attribute is composed of a label and a value. Examples of attributes are: label (value), company (XYZ Corp.), position (manager), employee number (#), employee social security number (#).

Example embodiment provides a mechanism to access the attribute value or enabling the value to answer a yes/no question by encrypting the attribute with a key k1 and adding this encryption to the token. The encrypted value is EV. Masking the attribute with a key k2 and adding this masked value to the token, the masked value is MV. In this example, someone with access to k1 could access the value of the attribute by decrypting EV from the token and someone with access to k2 could answer a yes/no question by unmasking MV from the token. But this implies that for each attribute two entries should be added to the token, EV and MV, this duplicates the size of the token. The approach permits handling both operations by including a single entry on the token by masking and encrypting the value.

An example use case may include the 'Red Cross' blood bank application. The Red Cross blood bank is managed in a secure and private way regarding information of potential blood donors. In particular, the Red Cross is interested in identifying any preexisting conditions that could forbid someone from donating blood. To do so, a blockchain application may be developed for the Red Cross blood bank to handle this information. Donors are required to request tokens from a certificate authority that is part of this blockchain system. Inside each token the following donor information is included as masked and encrypted attributes, thus guaranteeing that all information is private and secure: blood group, blood type, full name, birth date, weight, height, eligibility criteria (one entry per criteria item). The eligibility criteria are a list of masked and encrypted attributes. There is one entry in each token per item on this list. An example of the values of this list are asthma, bleeding condition, cancer, Creutzfeldt-Jakob disease (CJD), diabetes, heart disease, hemochromatosis, hepatitis, hypertension, malaria, piercings, sexually transmitted diseases, tattoos, midichlorian count, travel outside of U.S., immigration, tuberculosis, Zika virus exposure, etc. When a donor wants to prove if he/she meets the criteria to donate blood he/she will submit a request to the blockchain system with one of his/her tokens attached and the keys needed to access the information contained in the token in the following way: blood group→send encryption key for full access, blood type→send encryption key for full access, full name→no key sent, identity is private, birth date→send encryption key for full access, weight→send encryption key for full access, height→send encryption key for full access, eligibility criteria (one entry per criteria item)→send masking keys for each item to allow only yes/no questions without revealing concrete values. It is important to notice that for some information contained in the token, full access is provided while for the eligibility criteria only yes/no questions are permitted. Additionally, the identity of the donor is kept secret, but given that the token will be stored in the blockchain, it could be made accessible at a later time if an auditor or an interested party with the right privileges requires access.

Figure 2C:
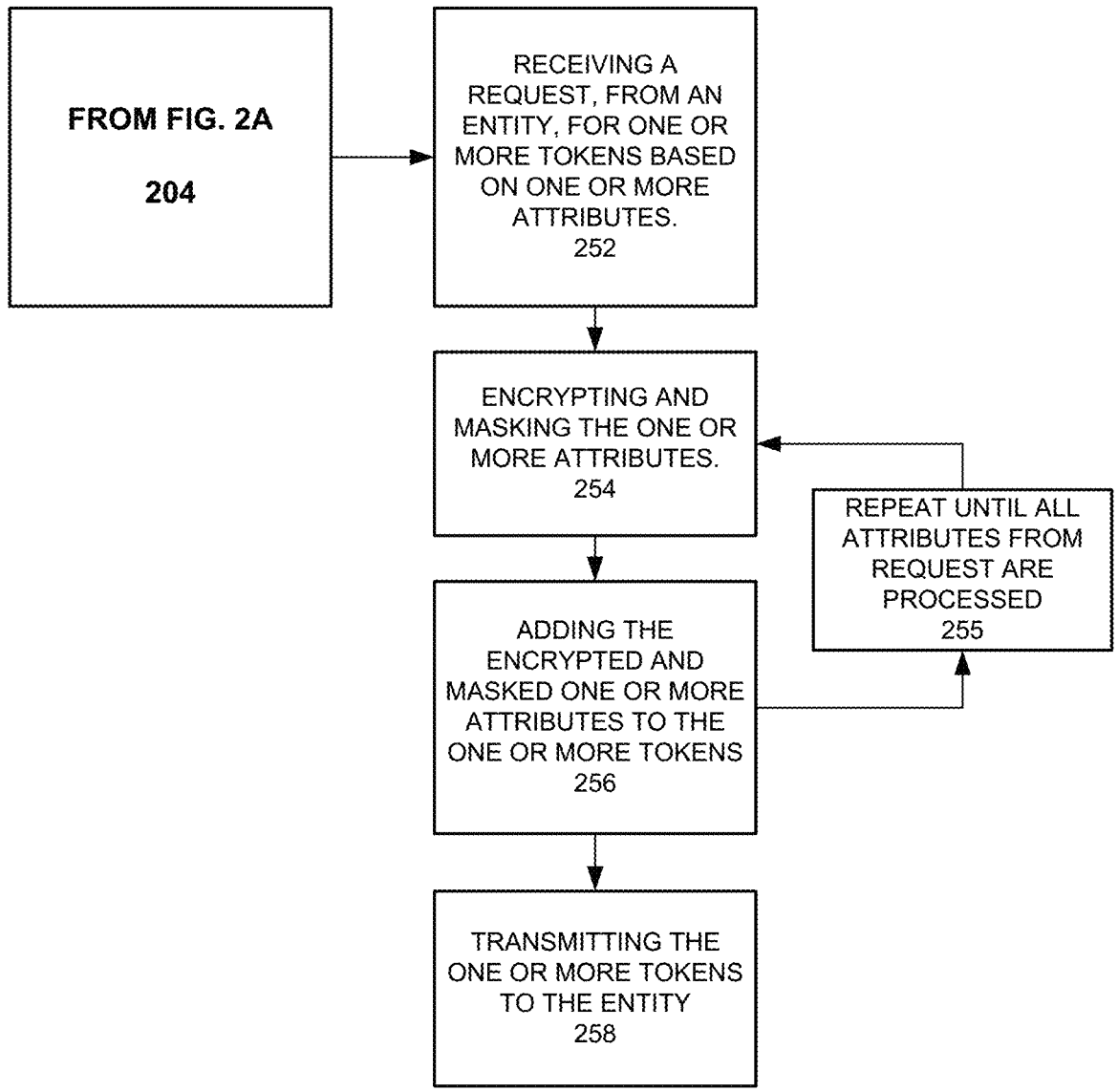
FIG. 2C illustrates another example of a user requesting tokens according to an example embodiment.

FIG. 2C illustrates another example of a user requesting tokens. Referring to FIG. 2C, the operation 204 may have another sub-process of operations similar but fewer in number than the example in FIG. 2B. This example includes receiving a request, from an entity, for one or more tokens based on one or more attributes at operation 252, encrypting and masking the one or more attributes at operation 254, adding the encrypted and masked one or more attributes to the one or more tokens at operation 256 and transmitting the one or more tokens to the entity 258. The process is repeated until all the attributes from the request are processed 255. An entity can request to include multiple attributes when requesting tokens. In this example, all attributes sent must be verified, masked and encrypted in order to be added to the token.

According to the various examples, an optimal approach to permitting an interested party to read an actual value or make assumptions regarding a value may include a single attribute being encrypted and masked, which avoids duplication of information in the token and permits an interested party to read the actual value or make assumptions regarding the value. Such an approach provides control to the entity that owns the attribute. The entity can make a decision whether to reveal the actual value or just enable the interested party to answer a question regarding the attribute, such as "do you own this particular value for this attribute?" Such a configuration will not unnecessarily reveal information if the inputted value does not match the presumed value. After the sequence of operations, at a later time, an interested party (i.e. a validator or an auditor) could request access to a particular attribute. In that case the access could be to know the actual value. For example, the owner of the token may release the masking key and the interested party will compute the decryption key in order to decrypt the attribute value. In order to know if the attribute has a particular value, the owner of the token releases the encryption key and the interested party computes the masking key and encrypts and masks the presumed value for comparison with the original encrypted and masked value from the token. With regard to the single attribute, once the attribute is verified, the keys for masking and encrypting the attributes are computed, the single attribute is then masked and encrypted and the value resulting from applying masking and encrypting operations to the attribute is included in the token. The token may be used to determine whether access or permission of execution is granted for the owner of the token.

Figure 3A:
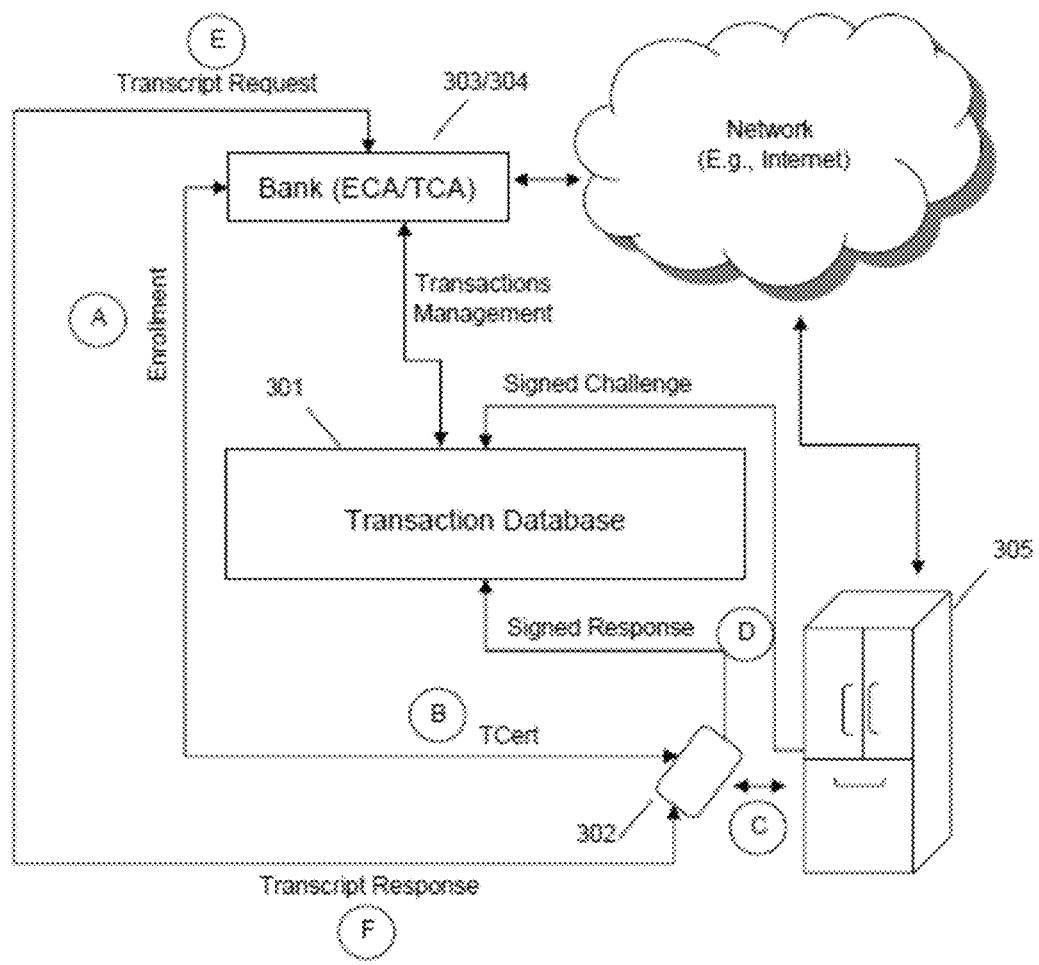
FIG. 3A illustrates an example use case for tokenized transactions according to an example embodiment.

Referring to FIG. 3A, in an example use case, an embodiment provides for dynamic identities for privacy preservation, identity protection and anomaly detection. Such techniques may be used for example in connection with financial services. Referring to FIG. 3A, in an enrollment process indicated at 'A', an entity 302 is enrolled with an enrollment certificate authority (ECA) 303, which may include a functionality of a transaction certificate authority (TCA) 304. In one example, a bank or other financial institution may act as the ECA 303. An authentication technique is established, e.g., a biometric template is initialized (if this security enhancement is offered by the bank 303). For example, biometric authentication may be periodically required in order for the entity 302 (the entity's device, e.g., a user's smart phone, etc.) to be able to access an embedded EnrollPriv_Key to derive TCertPriv_Key from a TCert, e.g., received from a transaction certificate authority (TCA) 304, indicated at 'B'. Such biometric authentication can be useful in that it associates the smart phone with the user in such a way that it is more difficult for a lost or borrowed phone to be used to establish patterns of activity by other than the registered user of the smart phone.

TCerts and signatures generated using TCertPriv_Keys are used to respond to close-range challenges (indicated at 'C') issued wirelessly by devices, e.g., Internet of Things (IoT) devices. For example, a short range wireless challenge, such as a communication facilitated by BLUETOOTH LE communication or near field communication (NFC), may be issued (and signed) by a registered device 305, e.g., a personal appliance such as a refrigerator registered to the user and having a fixed identity or identifier, where the challenges the device 305 initiates may be signed in association with long-term certificates that include the corresponding signature verification public keys. By way of specific example, a personal appliance like a refrigerator 305 may be registered to a homeowner's address upon scheduled delivery and thereafter may require appropriate authorization for registration update. The entity 302 may need to send an appropriate response at 303, e.g., facilitated using TCerts as described herein, in order to respond to the challenge issued by device 305. The device 305 may be a device that is of known static location, such as a street light pole. User interaction via entity 302 with devices of known location may be used to establish patterns of user activity.

Localized challenge-response communications may be required as a precondition and/or for auditability of certain high-value transactions. For example, a user's profile may be set such that the user's device entity 302 is in his or her kitchen when certain types of transactions are conducted. Signed challenges and signed responses are uploaded to the transaction database 301 (blockchain), indicated at 'D'. A user, e.g., associated with entity 302, may provide a full or partial transcript of his or her whereabouts during a period of interest to an institution such as a bank, e.g., by placing an appropriate query for transaction identifiers, indicated at 'E', to the TCA 304, and receiving a response, indicated at 'F', where the TCA 304 inspects transactions database 301, as described herein. In contrast, someone pretending to be the user cannot feasibly do so. Thus, the identity of the entity such as entity 302 is no longer as easy to surreptitiously obtain and fraudulently use as compared to a fixed credential such as a personal identification number, Social Security Number, or driver's license number. Rather than combining the functionality of an ECA 303 and TCA 304, as at a bank, a bank may be authorized to query a TCA regarding the transactions of all entities 302 that have enrollment certificates issued by the bank as an ECA 303. A bank or other institution associated with an ECA 303 can transfer or delegate authorization to another bank or institution to query a TCA 304 concerning entities 302 that are enrolled via ECA 303.

In one embodiment, user behavior may be considered to be anomalous even if someone claiming to be a specific user can provide data regarding that user's whereabouts, e.g., by having surreptitiously compromised EnrollPriv_Key from that user's smart phone so as to be able to successfully query the TCA as that entity 302. User behavior may be considered anomalous if it is inconsistent with that user's established patterns of activity and/or whereabouts as recorded via smart phone interaction with devices.

The description provided herein references transaction database 101 as an example of a time-sequenced immutable database implemented using a plurality of computing nodes. The nodes may be entities such as entity 102, 105 of FIG. 1 and/or other computing nodes that manage copies of the database in a distributed fashion. Certain functionality has been ascribed to various elements, e.g., the TCA 104 has been described as an entity that issues token(s) and acts to manage requests regarding tokenized transactions of the database. However, these descriptions have been provided herein for simplicity sake and it should be noted that the function(s) ascribed to a particular element or entity within the system may be performed by another or group of other system element(s).

An audit tree is independent of a transaction, i.e., by consulting TCerts on a blockchain (TCert type 2 of recipient and TCert type 1 of transaction creator). The tree is hierarchical to limit access to auditor's allowed domain/jurisdiction. This achieves that there is no leakage to the auditor of information pertaining to users outside of an auditor's jurisdiction. Representation of attributes may be encrypted and masked (possibly/potentially padded) attributes. The attribute value may be a hash, a certificate or any other derivative of the original attribute value. By using the audit tree, auditors gain access to all attributes within eligible TCerts. A TCert is eligible if the TCert owner falls within the auditor's jurisdiction(s) or domain(s). The auditor will check the TCert against all its eligible jurisdictions or domains previously stored in memory until an identification can be made or all his jurisdictions failed to check. If it gets a hit then the auditor will try to decrypt the rest of the attributes. Validators and/or recipients within the transaction receive keys to decrypt and verify attributes. The transaction creator releases these attribute specific keys. The transaction creator releases attribute specific keys for their own attributes, but it could also release attribute specific keys for the recipients provided that the recipient provides to the transaction creator these keys. Each attribute specific key is also TCert specific. Auditors have access to attribute specific keys by having access to TCert specific key and then they use that key to generate attribute specific keys. We need to maintain unlinkability even from the perspective of authorized transaction participants. This property holds with respect to not just what the participants learn individually, also what they can do collectively if they collude. Mapping of subaccounts to one user would be hidden. However the issuing institution and the TCA know and will be able to link the subaccounts.

The participants, validators and endorsers will not have knowledge about certain information unless the user informs them directly. Using a hierarchy of trust with the public key infrastructure (PKI), the system is based on 3 types of Certificate Authorities (CA): Enrollment Certificates (ECerts), which are relatively static (long-term) certificates with user ID and affiliation, acquired via registration with an Enrollment CA (ECA); Attribute Certificates (ACerts), which are generated after enrollment based on user ID and affiliation, and which include an enrollment public key from an Enrollment Certificate, acquired via an Attribute CA (ACA); Transaction Certificates (TCerts), which are short-term certificates that faithfully but pseudonymously represent enrolled users, acquired via a Transaction CA (TCA).

The TCA provides dynamic pseudonyms. Control points need to be performed as a result of a process of elimination. It cannot be done at the enrollment level because there is not enough knowledge at that point. The information is not available at enrollment time. It cannot be in the hands of the end users or the validators. They have the knowledge but they don't need to know that a given key belongs to a particular auditor type (i.e., law enforcement, internal auditors, etc.) such information should not be available. As an example, a given set of attributes provided by a user could indicate the corresponding group of validators. Validators and users can obtain access wrongfully, as a user can release the attributes for a validator group that is not the intended one. Validators could process it anyway, but auditors will have the required information to verify that this group of validators processed the transaction instead of the intended one. These control points will fail if they can be bypassed by using enrollment certificates instead of transaction certificates in the transactions.

Figure 3B:
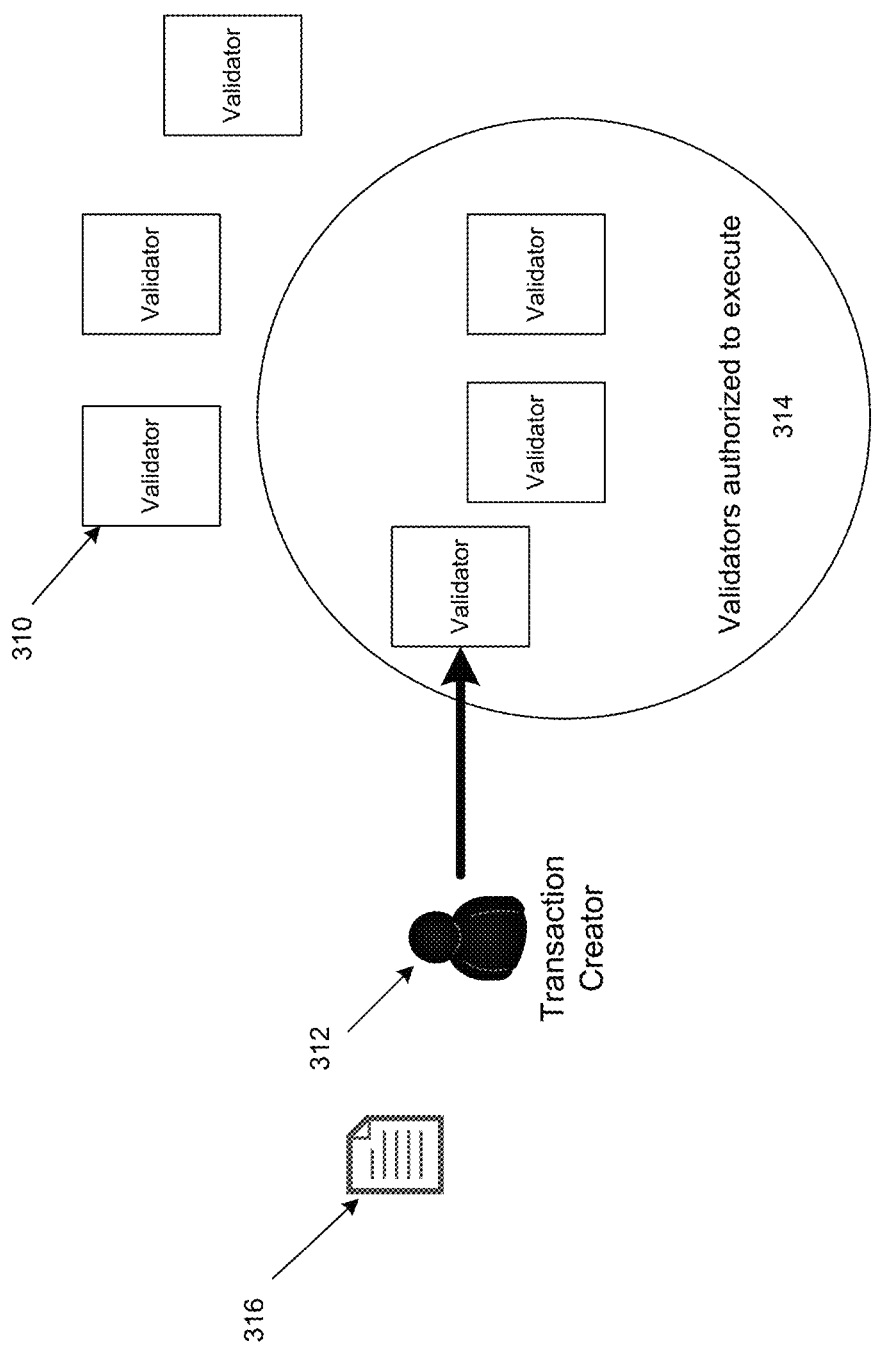
FIG. 3B illustrates an asset transfer example use case according to an example embodiment.

FIG. 3B illustrates an asset transfer example use case. Referring to FIG. 3B, the asset transfer, as represented as a transaction with a validator, may include TCerts 316 that include affiliation and user ID, as extracted from an enrollment certificate, as well as subaccounts, where these are all encrypted and masked prior to inclusion within the TCerts. The transaction may include the TCert from the transaction creator, keys to decrypt or verify affiliation, and a subaccount from the user. Also, the intended asset recipient subaccount is used without the TCert. The transaction creator 312 may submit a TCert to validators which are authorized to execute the transaction 314. The validators that are not authorized 310 may not have access to the transaction.

A key agreement between transaction creator and a validator group may include a transaction creator which uses a validator group public key and a transaction creator random private key. A validator group uses a validator group private key and a transaction creator random public key. The transaction creator random public key is included in the clear in the transaction. For a key agreement between transaction creator and intended asset recipient, the transaction creator uses an intended asset recipient's TCert key agreement public key and a transaction creator random private key, which could be the same transaction creator random private key as used in combination with a validator group public key by the transaction creator. An intended asset recipient uses a TCert key agreement private key, and a transaction creator random public key, which could be the same used in the other transactions. The TCerts used are included in the clear in the transaction. With regard to key agreement between the transaction creator and itself, the transaction creator uses a transaction creator TCert key agreement public key and a transaction creator random private key, where such transaction creator random private key could be the same as used in previous operations above. For subsequent plaintext recovery, the transaction creator uses a TCert key agreement private key and a transaction creator random public key, where such transaction creator random public key could be the same as used in previous operations above. The TCerts used in previous operations are included in the transaction. The transaction creator is used to encrypt the random private key of the transaction creator. This encrypted key is included in the transaction cipher text.

Figure 3C:
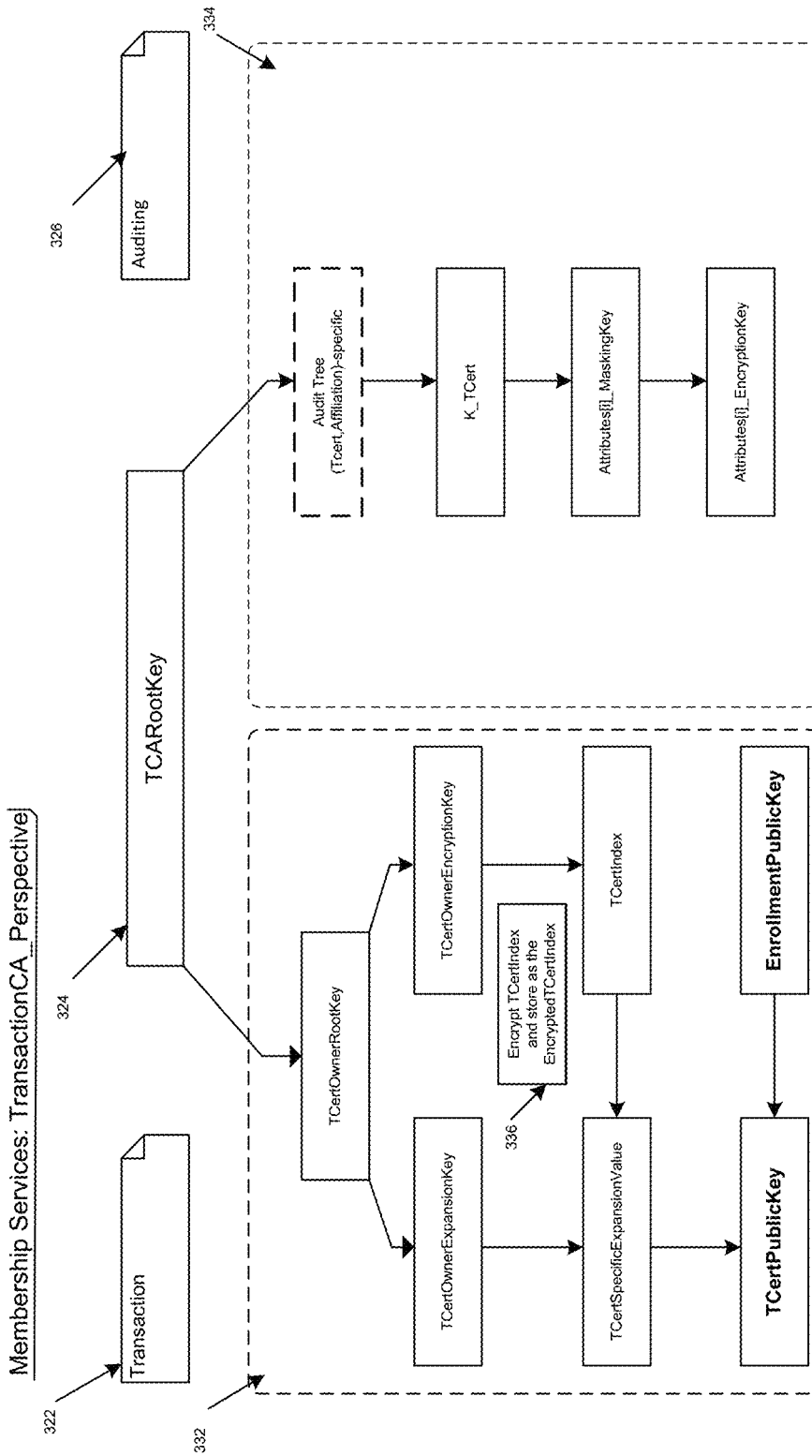
FIG. 3C illustrates key management logic from a TCA perspective according to an example embodiment.
Figure 3D:
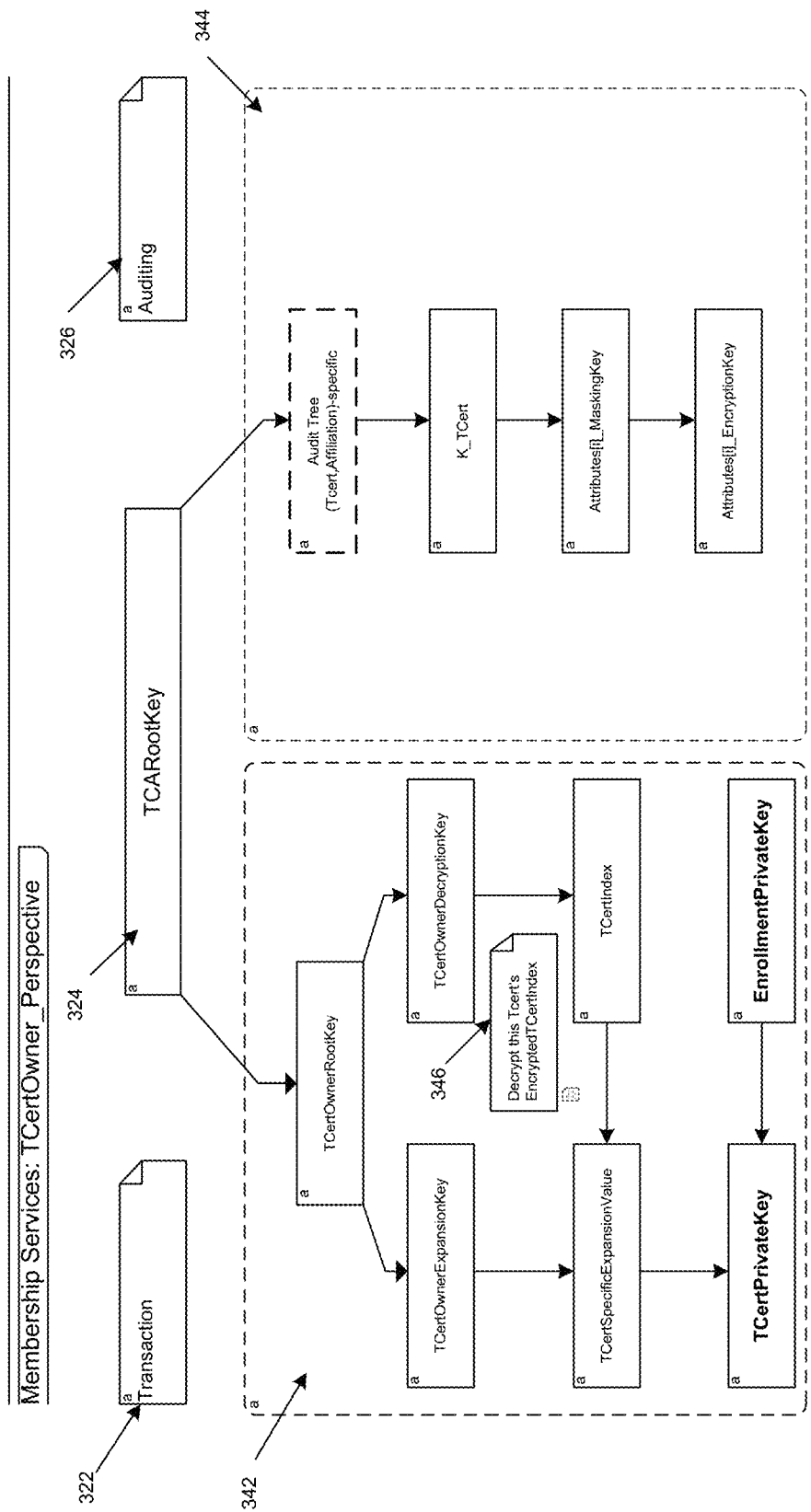
FIG. 3D illustrates key management logic from a user perspective according to an example embodiment.

FIG. 3C illustrates key management logic from a TCA perspective. In this example the TCertOwnerEncryptionKey is sent with encrypted TCertindex and stored as shown from the TransactionCA perspective. FIG. 3D illustrates key management logic from a user perspective. Referring to FIG. 3D, the TCert is decrypted as shown from the TCertOwner perspective.

An attribute certificate authority (ACA) was incorporated to the membership services temporarily in order to permit a mandate on how to communicate. The ACA will have a DB to hold attributes for each user and affiliation. This DB is encrypted including userID affiliation attribute Key—the lookup key attribute value, validity period of the attribute, etc. This is a hybrid approach as it sits inside but is intended to interact with the outside world to fetch attribute values. The model does not prevent communication with the outside world. In FIG. 3C, the transaction 322, the TCARootKey 324 and the Auditing platform 326 are fundamental to the process. The TCARootKey 324 is used to initiate the encryption process 332 and encrypt the TCertIndex 336. The TCARootKey 324 also provides an Audit Tree 334 which creates the masking key and the encryption key. For FIG. 3D, the TCertOwner perspective may include a process 342 to decrypt the TCert 346. The Audit Tree 344 may be similar to the example in FIG. 3D.

Figure 3E:
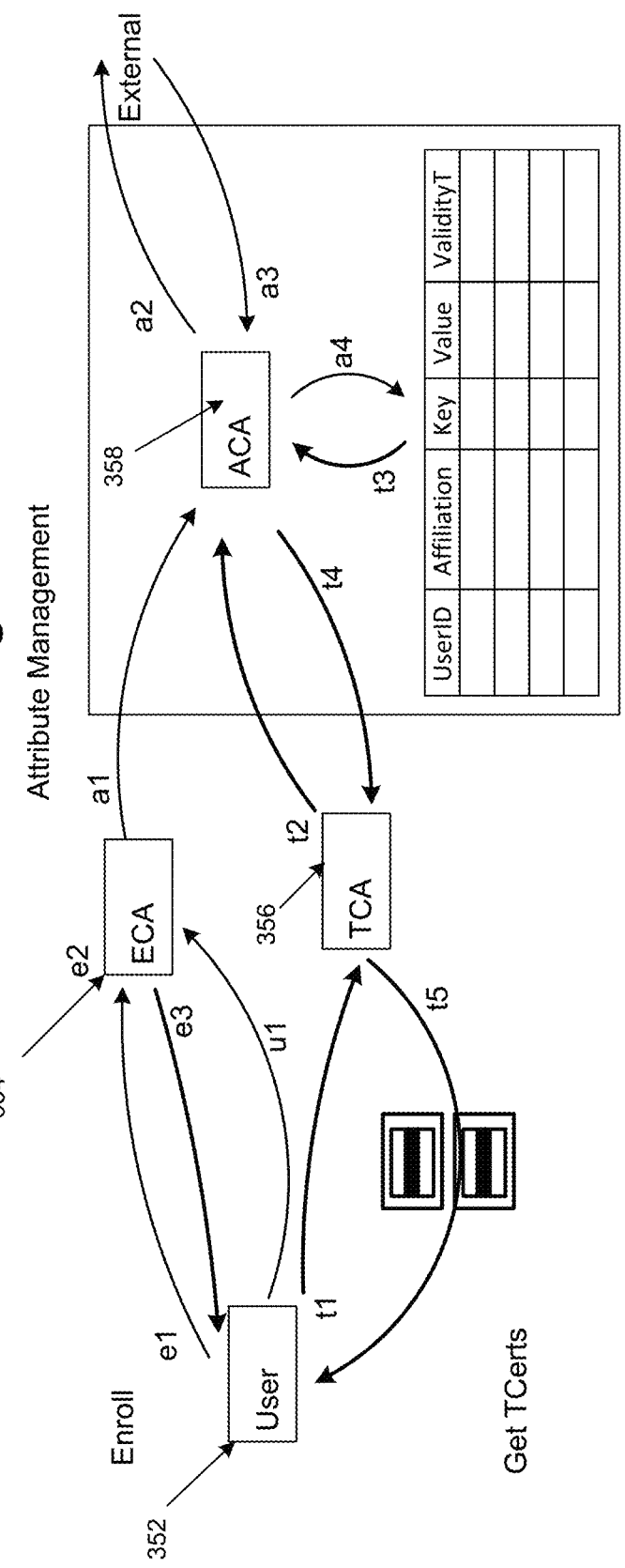
FIG. 3E illustrates attribute generation and processing according to an example embodiment.

FIG. 3E illustrates attribute generation and processing. Referring to FIG. 3E, in operation a user 352 requests an ECert to ECA, the ECA 354 creates the ECert, and the ECA issues a fetch request (ECert) under TLS signed with the ECA private key to the ACA. This request triggers the ACA mechanism that fetches attribute values from the outside world and populates the database. The attributes may be identified and used to populate the DB with autogenerated data or from a config file data. The set of attributes are not static and attributes can expire. The user can have a new attribute that is not in the DB because the fetch happened some days prior to the instance. The user can issue a refreshAttributes(ECert) to incorporate the changes into the ACA 358. The refresh can be triggered for any ECert the user provides. When the user needs TCerts to generate a transaction the user requests a batch of TCerts to the TCA and provides a batch size (i.e. how many TCerts). ECert, and list of attributes i.e., Company: IBM, Position: Software Engineer, the TCA sends a request to ACA to get those attributes, RequestAttributes( ) this request contains: ECert, Company:Hash(IBM) Position: hash(Superman), Under TLS, signed with TCA 356 private key, the ACA performs a lookup in his internal DB and will reply one of the following: "You do not have any of those attributes" (error), "You have all attributes" and return a X.509 certificate with all the attributes and the ECert public key inside the certificate so we the same type of X.509 certificate as the TCerts and ECerts can be used. The ACA is will not verify the validity period of the attributes. It will be treated in the TCA to filter which attributes are still valid.

Figure 3F:
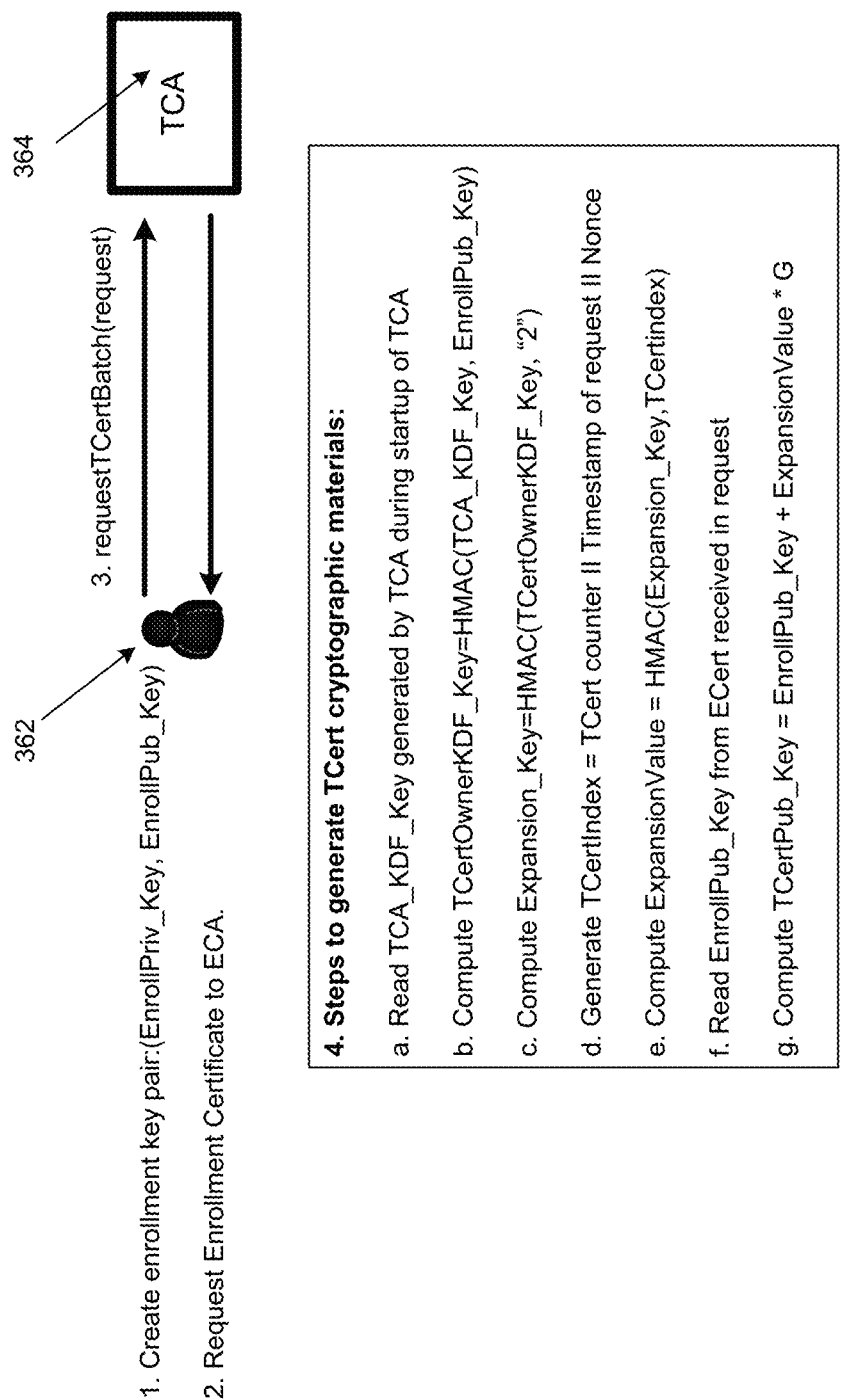
FIG. 3F illustrates key derivation to generate cryptographic materials according to an example embodiment.

FIG. 3F illustrates an example procedure of a user 362 requesting a token(s) and creating a TCert response. In FIG. 3F, the TCA_KDF_Key is read as generated by the TCA 364. The owner key, expansion key are computed and an expansion value is generated. The public key is read from the request and the TCert is then generated based on the enrollment public key and the expansion value.

The TCA checks a validity period for attributes and updates the list by eliminating those that are expired. Then the TCA will check how many (and which ones) of the attributes the user will actually receive inside each TCert. This information needs to be returned to the user so the user can decide if the TCerts are useful or whether to perform further actions (i.e., issue a refreshAttributes command and request a new batch, issue an error and/or use of the TCerts). The TCA could have other criteria/rule to update the valid list of attributes and this will not break any legacy stuff. The TCA creates TCerts and populates them with valid attributes. The TCA encrypts the attributes with the keys derived from the audit tree.

All TCerts in a batch will have the same attributes and validity period (using the same RevocK value). For a TCA_Revoke_Key available to the TCA, let RevocK=HMAC(TCA_Revoke_K, Attribute(s)||ValidityPeriod)—where Attribute(s) and ValidityPeriod correspond to the particular batch of TCerts. RevocK may be truncated to yield Truncated_RevocK. Let the TCA-signed CRL (or delta CRL) include entries of the form ValidityPeriod||Truncated_RevocK(s). The revocation test for a given TCert entails checking all RevocK(s) (if any) in a CRL that correspond to the same ValidityPeriod as that in the TCert being tested. TCertID Encrypted&Masked Attributes (indexed by Attribute Type) includes two mandatory attributes, i.e., UserID and Affiliation, where auditor first checks Encrypted&Masked Affiliation field for a match against one of the Affiliations within its jurisdiction, Revocation Field, [=Truncated_Hash(TCertID||Truncated_RevocK)], Signature Verification Public Key, (for verifying the signatures on transactions), Encrypted TCertIndex, [=AES_CBC_Encrypt TCertOwnerEncrypt_Key (TCertIndex||Constant Pad)], (where TCAOwnerEncrypt_Key is derived from a key, TCertOwnerRoot_Key, supplied to the TCert owner with the TCert batch (constant for all batches of that TCert owner)), ValidityPeriod, [Not Valid Before xxxx, Not Valid After yyyy].

A compact representation of the attribute may be used that can be either decrypted or verified. A vanilla approach would be to use encryption of the attribute and HMAC to verify the validity of the attribute. Verification of having a specific attribute (yes/no question 'do you have this attribute?') is on an attribute specific basis, for example, a validator could verify Attribute_A and get the value (i.e., decrypt) for Attribute_B. Masking and Encryption Keys, for i:=1 to number of attributes, b:=ceiling(bit_length(Attribute[i])/256)(number of 256 blocks), Attribute_MaskingKey[i]:= HMAC384(PreK0, i)256_truncated, Attribute_EncryptionKey[i]:=HMAC256(Attribute_MaskingKey[i], "1"), Dynamic Attribute Masking and Encryption Mask=HMAC256(Attribute_MaskingKey[i], "2")||, HMAC256(Attribute_MaskingKey[i], "3")||, HMAC256 (Attribute_MaskingKey[i], "4")|| . . . HMAC256(Attribute_MaskingKey[i], "b")(*), EncryptedAndMaskedAttribute= EncAttributes[i]_EncryptionKey(Attribute[i])⊕ [Attribute_ MaskingKey[i]||Mask], (*) The attribute length in bits is a multiple of 128, if it is an odd multiple then use, HMAC256 (Attribute_MaskingKey[i], "b")128_truncated.

For decrypting dynamic attributes, given an Attribute_ MaskingKey[i], generate the Mask and the Attribute_EncryptionKey[i]. Verification, Given an Attribute_EncryptionKey[i], then let, EncAttr:=EncryptAttribute_EncryptionKey[i](Presumed_Attribute[i] value)., Masked:= EncAttr ⊕ TCert's Attribute[i] entry, and then check if: HMAC256(most significant 256 bits of Masked, "1")==the received Attribute_EncryptionKey[i]. The operations to accompany the one chart showing the asset transfer use case the user obtains the TCert from membership services. The TCert includes encrypted and masked sub-accounts, affiliation and userID, the user sends Tx to a group of validators that are authorized to see this Tx, a validator decrypts an affiliation using a key provided by the TCertOwner creator, the validator decrypts sub-account using key provided by the TCertOwner creator and/or validator. In every TCert the following fields may be included: a UserID attribute extracted from enrollment certificate, and an affiliation attribute extracted from enrollment certificate. Additionally, several sub-accounts are included.

The TCA knows about the sub-accounts because of interaction with the ACA. This could also be done from the ACA. The same approach could be used to resolve the authentication issue we have at enrollment time with the username/password. For any one attribute one type of key may be released—i.e., either the verification key or the encryption key can be released. KSub—show Affiliation_K or sub-accountXXXX. For instance, by releasing to the validator using lightweight TCert type 2. Release over key-agreement the key for affiliation and the key for exactly one of the sub-accounts. Full solution uses compact key agreement TCerts and keyless attribute certificates.

One example method of operation may include, for token management in a multi-tenant transactional database, a hierarchically-scoped audit mechanism that enables passive access to the identities of those users who possess one or more attributes that are within the assigned scope of the auditor's jurisdiction. The hierarchically-scoped audit mechanism enables passive access to transaction-specific keys that are usable to disclose secondary attributes of users who possess one or more primary attributes that are within the assigned scope of the auditor's jurisdiction. Additionally, the audit mechanism may enable auditors to passively decrypt to recover attributes possessed or owned by transaction creators, where proofs of ownership of such attributes are selectively releasable to non-auditor transaction participants as designated by transaction creators. Also, a proof-of-attribute-ownership method may be used to enable the attribute owner to derive two keys, the first of which can be used to reveal to a verifier the attribute the ownership of which is proved, and the second of which can be used to prove attribute ownership only if the verifier has independent knowledge of the attribute. The second key may be derivable from the first key via a one-way function.

Figure 4:
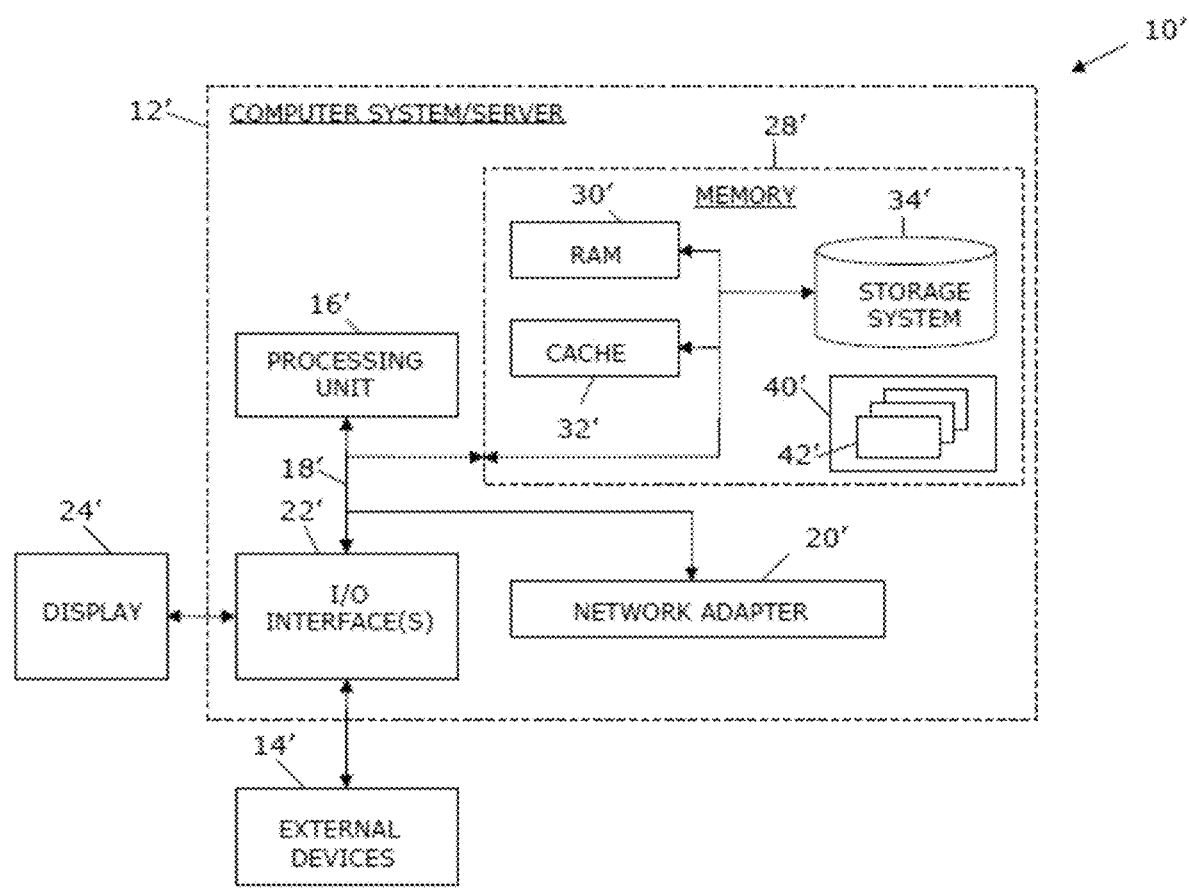
FIG. 4 illustrates a computer system according to an example embodiment.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/nonremovable, volatile/non-volatile computer system storage media. By way of example only, storage system 34' can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the application.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the application as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the application have been described herein with reference to the accompanying drawings, it is to be understood that the embodiments of the application are not limited to those precise embodiments, and that various other changes and modifications may be affected therein by one skilled in the art without departing from the scope or spirit of the disclosure.

The present application may be a system, a method, and/or a computer program product. The computer program product may include a computer readable storage medium (or media) having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present application are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present application.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method, comprising:
receiving a request, from an entity, for one or more tokens based on one or more attributes, the one or more attributes satisfying one or more conditions of a transaction to be recorded in a decentralized database, the one or more attributes including a first information indicating a representation of a value without indicating the value and second information providing access to the value;

encrypting and masking the one or more attributes;

adding the encrypted and masked one or more attributes to the one or more tokens; and transmitting the one or more tokens to the entity in order to confirm the transaction before the transaction occurs, the one or more tokens transmitted by an authority of a decentralized database authorized to issue the one or more tokens to be included in the transaction to be recorded in the decentralized database.

2. The method of claim 1, further comprising:

selecting the one or more attributes; and generating a masking and attribute encryption key to use when encrypting and masking the one or more attributes.

3. The method of claim 1, further comprising repeating the adding of the encrypted and the masked one or more attributes to the one or more tokens until all the one or more attributes from the request are processed.

4. The method of claim 2, further comprising verifying validity and ownership of the attributes by the entity prior to generating the masking and attribute encryption key.

5. The method of claim 1, wherein the one or more tokens comprise a single attribute root key.

6. The method of claim 1, wherein the one or more attributes identify the entity and comprise a label and a value.

7. The method of claim 1, wherein the one or more tokens transmitted to the entity comprise one or more answers to one or more questions submitted by the entity.

8. An apparatus, comprising:

a receiver configured to receive a request, from an entity, for one or more tokens based on one or more attributes, the one or more attributes satisfying one or more conditions of a transaction to be recorded in a decentralized database, the one or more attributes including a first information indicating a representation of a value without indicating the value and second information providing access to the value;

a processor configured to encrypt and mask the one or more attributes;

add the encrypted and masked one or more attributes to the one or more tokens; and a transmitter configured to transmit the one or more tokens to the entity in order to confirm the transaction before the transaction occurs, the apparatus corresponding to an authority of a decentralized database authorized to issue the one or more tokens for inclusion in the transaction to be recorded in the decentralized database.

9. The apparatus of claim 8, wherein the processor is further configured to select the one or more attributes, and generate a masking and attribute encryption key to use when the processor encrypts and masks the one or more attributes.

10. The apparatus of claim 8, wherein the processor is further configured to repeat the adding of the encrypted and the masked one or more attributes to the one or more tokens until all the one or more attributes from the request are processed.

11. The apparatus of claim 9, wherein the processor is further configured to verify validity and ownership of the attributes by the entity prior to the generation of the masking and attribute encryption key.

12. The apparatus of claim 8, wherein the one or more tokens comprise a single attribute root key.

13. The apparatus of claim 8, wherein the one or more attributes identify the entity and comprise a label and a value.

14. The apparatus of claim 8, wherein the one or more tokens transmitted to the entity comprise one or more answers to one or more questions submitted by the entity.

15. A non-transitory computer readable storage medium configured to store instructions that when executed cause a processor to perform:

receiving a request, from an entity, for one or more tokens based on one or more attributes, the one or more attributes satisfying one or more conditions of a transaction to be recorded in a decentralized database, the one or more attributes including a first information indicating a representation of a value without indicating the value and second information providing access to the value;

encrypting and masking the one or more attributes;

adding the encrypted and masked one or more attributes to the one or more tokens; and transmitting the one or more tokens to the entity in order to confirm the transaction before the transaction occurs, the one or more tokens transmitted by an authority of a decentralized database authorized to issue the one or more tokens to be included in the transaction to be recorded in the decentralized database.

16. The non-transitory computer readable storage medium of claim 15, wherein the processor is further configured to perform:

selecting the one or more attributes; and generating a masking and attribute encryption key to use when encrypting and masking the one or more attributes.

17. The non-transitory computer readable storage medium of claim 15, wherein the processor is further configured to perform:

repeating the adding of the encrypted and the masked one or more attributes to the one or more tokens until all the one or more attributes from the request are processed.

18. The non-transitory computer readable storage medium of claim 16, wherein the processor is further configured to perform:

verifying validity and ownership of the attributes by the entity prior to generating the masking and attribute encryption key.

19. The non-transitory computer readable storage medium of claim 15, wherein the one or more tokens comprise a single attribute root key.

20. The non-transitory computer readable storage medium of claim 15, wherein the one or more attributes identify the entity and comprise a label and a value, and wherein the one or more tokens transmitted to the entity comprise one or more answers to one or more questions submitted by the entity.

* * * * *